US011506862B2

(12) United States Patent
Yang

(10) Patent No.: US 11,506,862 B2
(45) Date of Patent: Nov. 22, 2022

(54) OPTICAL ELEMENT DRIVING MECHANISM

(71) Applicant: TDK TAIWAN CORP., Taoyuan (TW)

(72) Inventor: Yung-Ping Yang, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 366 days.

(21) Appl. No.: 16/778,588

(22) Filed: Jan. 31, 2020

(65) Prior Publication Data

US 2020/0249423 A1    Aug. 6, 2020

Related U.S. Application Data

(60) Provisional application No. 62/882,165, filed on Aug. 2, 2019, provisional application No. 62/799,886, filed on Feb. 1, 2019.

(51) Int. Cl.
| | |
|---|---|
| *G02B 7/09* | (2021.01) |
| *G02B 27/64* | (2006.01) |
| *G03B 13/36* | (2021.01) |
| *H02K 41/035* | (2006.01) |
| *G03B 5/00* | (2021.01) |

(52) U.S. Cl.
CPC .............. *G02B 7/09* (2013.01); *G02B 27/646* (2013.01); *G03B 5/00* (2013.01); *G03B 13/36* (2013.01); *H02K 41/0354* (2013.01); *G03B 2205/0007* (2013.01); *G03B 2205/0069* (2013.01)

(58) Field of Classification Search
CPC .......... G02B 7/09; G02B 27/646; G02B 7/08; G03B 5/00; G03B 13/36; G03B 2205/0007; G03B 2205/0069; G03B 3/10; G03B 30/00; H02K 41/0354; H02K 11/215; H02K 41/0356
See application file for complete search history.

(56) References Cited

U.S. PATENT DOCUMENTS

| | | | |
|---|---|---|---|
| 11,256,065 B2* | 2/2022 | Chen | G02B 27/646 |
| 2017/0329099 A1* | 11/2017 | Ichihashi | G02B 7/08 |
| 2017/0336699 A1* | 11/2017 | Hu | G02B 7/08 |
| 2019/0204532 A1* | 7/2019 | Konuma | G03B 5/00 |

(Continued)

FOREIGN PATENT DOCUMENTS

| | | | | |
|---|---|---|---|---|
| WO | WO-2018107725 A1 * | 6/2018 | | G02B 7/09 |

OTHER PUBLICATIONS

Machine translation of WO2018/107725A1 retrieved electronically from Espacenet Mar. 10, 2022 (Year: 2022).*

*Primary Examiner* — Cara E Rakowski
(74) *Attorney, Agent, or Firm* — Muncy, Geissler, Olds & Lowe, P.C.

(57) ABSTRACT

An optical element driving mechanism is provided. The optical element driving mechanism with a main axis includes a fixed part, a movable part, a first driving assembly, and a sensing assembly. The movable part moves relative to the fixed part. The movable part and the fixed part are arranged along the main axis. The movable part includes a frame and a holder. The holder moves relative to the frame. The first driving assembly drives the holder to move. The sensing assembly includes a reference element and a sensing element. The sensing element senses a movement of the reference element in order to sense a movement of the holder relative to the frame.

18 Claims, 20 Drawing Sheets

(56) References Cited

U.S. PATENT DOCUMENTS

2020/0033551 A1\* 1/2020 Lee .......................... G03B 5/00
2020/0249493 A1\* 8/2020 Yang ........................ G03B 3/10
2022/0035173 A1\* 2/2022 Min ..................... G02B 13/001

\* cited by examiner

OPTICAL ELEMENT DRIVING MECHANISM

CROSS-REFERENCE TO RELATED APPLICATIONS

This application claims the benefit of U.S. Provisional Application No. 62/799,886, filed on Feb. 1, 2019, and U.S. Provisional Application No. 62/882,165, filed on Aug. 2, 2019, the entirety of which are incorporated by reference herein.

BACKGROUND OF THE INVENTION

Field of the Invention

The present invention relates to a driving mechanism, and, in particular, to an optical element driving mechanism.

Description of the Related Art

As technology has developed, optical elements and optical element driving mechanisms, which are used for driving optical elements, have become miniaturized. Many electronic devices (such as tablet computers and smartphones) are equipped with at least one optical element, at least one optical element driving mechanism, and at least one light-detection element for capturing images and recording videos.

When a user uses an electronic device, shock or vibration may occur, and this may cause the images or videos to come out blurry. However, as the demand for higher quality in images and videos is increasing, an optical element driving mechanism that is able to perform displacement-correction and shake-compensation has been developed.

The optical element driving mechanism may drive the optical element to move along a direction that is parallel with the optical axis to autofocus (AF) on the scene to be shot. Additionally, the optical element driving mechanism may also drive the optical element to move along a direction that is perpendicular to the optical axis to perform optical image stabilization (OIS), which compensates for the deviation of the image caused by shaking or impact, and solve the problem of blurry images and videos. AF and OIS may enhance the quality of the image.

Nowadays, an optical element driving mechanism may additionally include a sensing assembly to achieve closed-loop feedback. Therefore, the configuration and design of the sensing assembly are important.

BRIEF SUMMARY OF THE INVENTION

An embodiment of the present invention provides an optical element driving mechanism. The optical element driving mechanism with a main axis includes a fixed part, a movable part, a first driving assembly, and a sensing assembly. The movable part moves relative to the fixed part. The movable part and the fixed part are arranged along the main axis. The movable part includes a frame and a holder. The holder moves relative to the frame. The first driving assembly drives the holder to move. The sensing assembly includes a reference element and a sensing element. The sensing element senses a movement of the reference element in order to sense a movement of the holder relative to the frame.

According to some embodiments, the first driving assembly includes two coils disposed on opposite sides of the movable part. A winding axis of each of the two coils is perpendicular to the main axis. The first driving assembly further includes a plurality of magnetic elements. The fixed part is polygonal when viewed along the main axis. None of the magnetic elements are disposed on a side of the fixed part. The optical element driving mechanism further includes a balance weight piece disposed on the side where no magnetic elements are disposed. The sizes of the magnetic elements are different in a direction that is parallel with the main axis. The sizes of the magnetic elements are different in a direction that is perpendicular to the main axis. The optical element driving mechanism further includes a second driving assembly driving the frame to move. The second assembly includes a coil assembly corresponding to the magnetic elements. The coil assembly is not disposed on the side where no magnetic elements are disposed. The coil assembly includes a first coil group and a second coil group disposed on adjacent sides of the fixed part. The number of coils of the first coil group is different than the number of coils of the second coil group.

According to some embodiments, the fixed part further includes a circuit board with a first direction maximum size extending in a first direction that is perpendicular to the main axis and a second direction maximum size extending in a second direction that is perpendicular to the main axis and the first direction. The first direction maximum size is different than the second direction maximum size. The circuit board may be C-shaped.

According to some embodiments, the movable part further includes an elastic element connected to the holder and the frame. The elastic element partially overlaps at least one of the sensing element and the reference element when viewed in a direction that is perpendicular to the main axis. The reference element is disposed on the holder and the reference element is close to where a light enters (a light entrance). The fixed part includes a case. The case includes a concave portion. The reference element is revealed in the concave portion when viewed along the main axis. The sensing element is disposed on the frame. The reference element does not overlap the sensing element when viewed along the main axis. The holder further includes a first stopping portion, and the reference element protrudes farther than the first stopping portion when viewed in a direction that is perpendicular to the main axis. The holder further includes two electrical connection portions connected to the first driving assembly. The electrical connection portions are disposed on the same side of the bottom surface of the holder. The holder further includes a second stopping portion. The electrical connection portions protrude farther than the second stopping portion when viewed in a direction that is perpendicular to the main axis. The circuit board includes a circuit board concave portion for receiving the electrical connection portions. The sensing assembly further includes another sensing element for sensing the movement of the frame relative to the fixed part. The another sensing element is revealed in the fixed part when viewed along the main axis. The another sensing element partially overlaps the fixed part when viewed in a direction that is perpendicular to the main axis. The optical element driving mechanism further includes a damping element disposed between the frame and the fixed part.

BRIEF DESCRIPTION OF THE DRAWINGS

The present invention can be more fully understood by reading the subsequent detailed description and examples with references made to the accompanying drawings.

DETAILED DESCRIPTION OF THE INVENTION

The following disclosure provides many different embodiments, or examples, for implementing different features of the provided subject matter. Specific examples of assemblies and arrangements are described below to simplify this disclosure. These are, of course, merely examples and are not intended to be limiting. For example, the formation of a first feature "on" or "above" a second feature in the description that follows may include embodiments in which the first and second features are formed in direct contact, and may also include embodiments in which additional features may be formed between the first and second features, so that the first and second features may not be in direct contact. Ordinal terms such as "first", "second", etc., used in the description and in claims do not by themselves connote any priority, precedence, or order of one element over another, but are used merely as labels to distinguish one element from another element having the same name. In addition, in different examples of this disclosure, symbols or alphabets may be used repeatedly.

Furthermore, spatially relative terms, such as "above" and the like, may be used herein for ease of description to describe one element or feature's relationship to another element or feature as illustrated in figures. The spatially relative terms are intended to encompass different orientations of the device in use or operation in addition to the orientation depicted in figures. The apparatus may be otherwise oriented (rotated 90 degrees or at other orientations) and the spatially relative descriptors used herein may likewise be interpreted accordingly.

The embodiments of the present disclosure will be described with reference to the drawings.

The First Group of Embodiments

Figure 1:
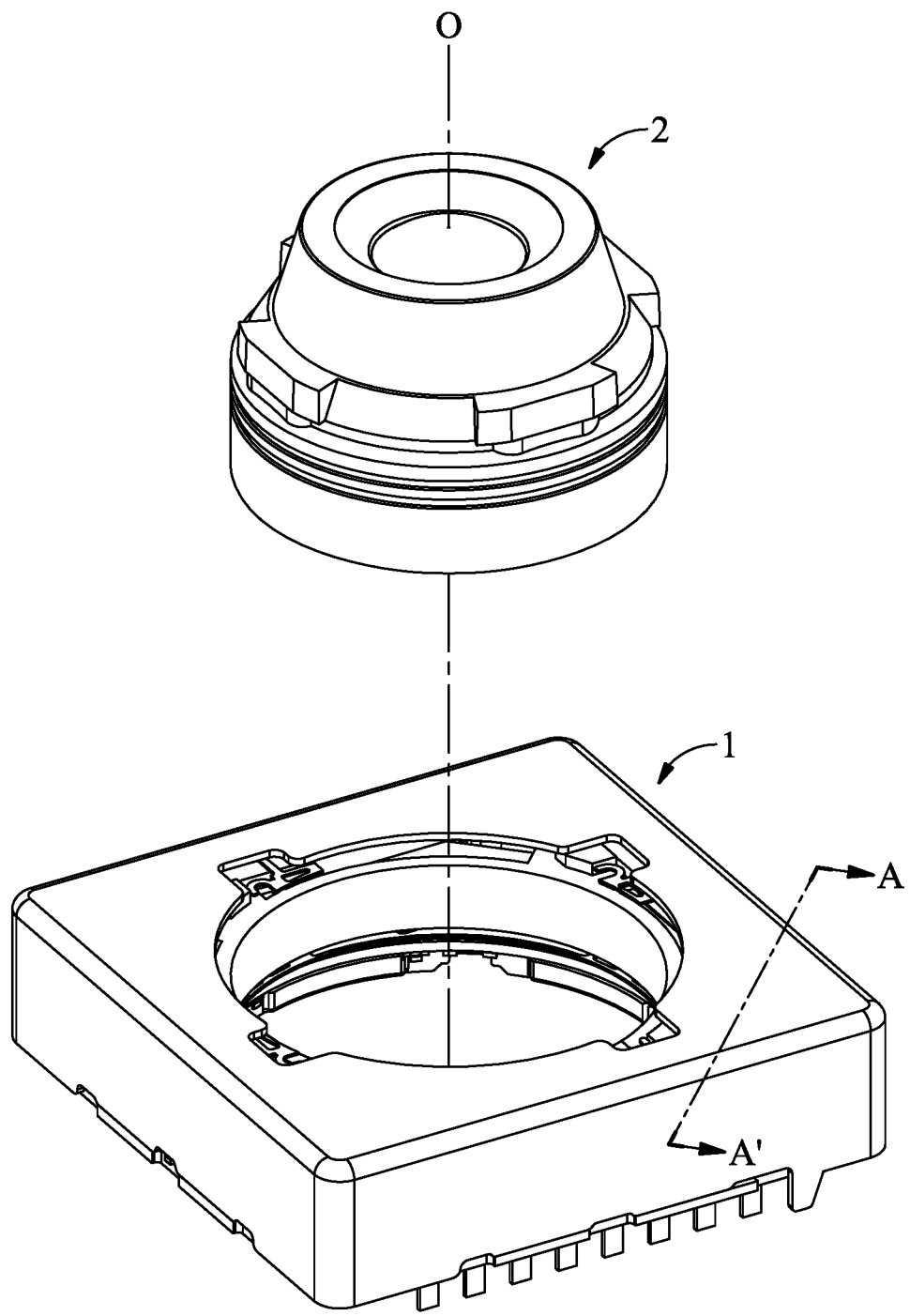
FIG. 1 is a perspective view of an optical element driving mechanism and an optical element according to some embodiments of the present disclosure.
Figure 2:
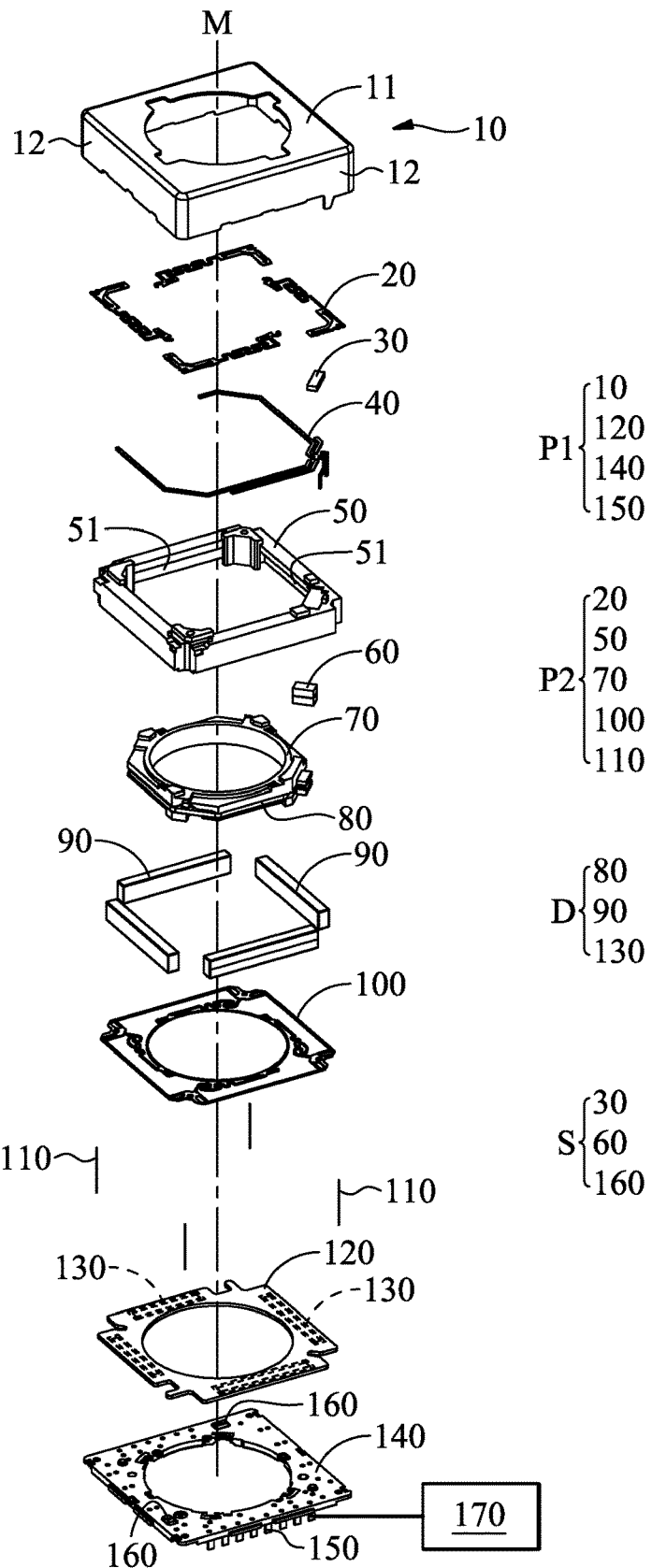
FIG. 2 is an exploded view of the optical element driving mechanism of FIG. 1.

First, please refer to FIG. 1 and FIG. 2. FIG. 1 is a perspective view of an optical element driving mechanism 1 and an optical element 2 according to some embodiments of the present disclosure. The optical element 2 has an optical axis O. The optical axis O is a virtual axis passing through the center of the optical element 2. FIG. 2 is an exploded view of the optical element driving mechanism 1 of FIG. 1

The optical element driving mechanism 1 includes a fixed part P1, a movable part P2, a sensing assembly S, and a driving assembly D. The movable part P2 is used for holding the optical element 2. The movable part P2 is movably connected to the fixed part P1, and thus the movable part P2 may move relative to the fixed part P1. The driving assembly D may drive the movable part P2 to move relative to the fixed part P1. The sensing assembly S senses the movement of the movable part P2 relative to the fixed part P1.

As shown in FIG. 2, the fixed part P1 includes a case 10, a circuit board 120, a bottom 140, and an external electrical connection portion 150. The movable part P2 includes four first elastic elements 20, a frame 50, a holder 70, a second elastic element 100, and four third elastic elements 110. The driving assembly D includes an AF coil 80, four magnetic elements 90 and four OIS coils 130. The sensing assembly S includes an AF sensing element 30, a reference element 60 and two OIS sensing elements 160. The elements may be added or omitted according to users' needs.

The fixed part P1 has a main axis M. The main axis M is a virtual axis passing through the center of the fixed part P1. When the optical element driving mechanism 1, the optical element 2, and a photosensitive element (not shown) (e.g. charge-coupled detector, CCD) are aligned, the optical axis O of the optical element 2 coincides the main axis M of the fixed parts P1.

The case 10, the circuit board 120, and the bottom 140 of the fixed part P1 are sequentially arranged along the main axis M. The case 10 includes a top wall 11 and four sidewalls 12. The top wall 11 is perpendicular to the main axis M. The sidewall 12 extends from an edge of the top wall 11 along a direction that is parallel with the main axis M. The case 10 is located above the circuit board 120 and the bottom 140, the sidewall 12 of the case 10 may be connected to the bottom 140 by soldering or welding, etc. The movable part P2, the sensing assembly S, and the driving assembly D, etc. may be accommodated in the space formed by the connection of the case 10 and the bottom 140 therein.

The case 10 is made of metal or non-metal material. The case 10 may be made of a material with magnetic permeability, such as ferromagnetic material, including iron (Fe), nickel (Ni), cobalt (Co), or an alloy thereof, for focusing and strengthening the magnetic force generated by the driving assembly D.

The circuit board 120 is disposed above the bottom 140. The circuit board 120 may be a flexible printed circuit (FPC) or a flexible-hard composite board. The circuit board 120 may be provided with electronic elements such as a capacitor, a resistor or an inductor. The bottom 140 is provided with circuits (not shown), and the circuits are formed by insert molding in the bottom 140.

The current is supplied to the optical element driving mechanism 1 through the external electrical connection portion 150. The external electrical connection portion 150 may be connected to a power supply source (not shown) outside the optical element driving mechanism 1. The external electrical connection portion 150 includes several pins for the current to flow in or flow out. The direction of the current is determined according to the direction of movement of the movable part P2 (for example, away from the bottom 140 or toward the bottom 140).

The first elastic element 20, the frame 50, the holder 70, and the second elastic element 100 of the movable part P2 are sequentially arranged along the main axis M. The frame 50 is made of a nonconductive material or a magnetically permeable material, such as plastic or metal alloy. When the frame 50 is made of magnetically permeable material, the frame 50 may similarly have the functions of maintaining magnetic force and enhancing magnetic force. Additionally, the frame 50 made of magnetically permeable material may have a higher structural strength than non-conductive material.

The outline of the frame 50 is a polygonal, such as a rectangle or a square. The frame 50 has four receiving holes 51 to receive the magnetic elements 90 and protect the magnetic elements 90. The frame 50 includes a circuit assembly 40. The circuit assembly 40 is formed inside the frame 50 by insert molding. The circuit assembly 40 has a three-structure dimensional structure and includes different pins that may be respectively used as a positive electrode and a negative electrode.

The holder 70 is hollow for holding the optical element 2. The holder 70 and the optical element 2 may be provided with corresponding screw structures so that the optical element 2 is fixed to the holder 70 better.

The first elastic element 20 and the second elastic element 100 of the movable part P2 are made of an elastic material or a ductile material, such as metal. In the art, the first elastic element 20 and the second elastic element 100 may be known as terms "spring", "spring leaf", "plate spring leaf", etc.

The first elastic element 20 connects to a portion of the frame 50 and the top surface of the holder 70 and the second elastic element 100 connects to a portion of the frame 50 and the bottom surface of the holder 70 in order to elastically clamp the holder 70. When the movable part P2 moves relative to the fixed part P1, such elastic clamping by the first elastic element 20 and the second elastic element 100 may limit the movement range of the holder 70 and prevent the holder 70 and the optical element 2 therein from being damaged because of the collision between the holder 70 and the case 10 or the bottom 140 when the optical element driving mechanism 1 moves or is affected by an external force.

The upper ends of the four third elastic elements 110 are respectively connected to the four first elastic elements 20 of the movable part P2, and the lower ends of the four third elastic elements 110 are connected to the four corners of the bottom 140 of the fixed part P1. As shown in FIG. 2, the four corners of the second elastic element 100 and the four corners of the circuit board 120 contract inwardly to provide space for the third elastic element 110.

As described above, the first elastic element 20 is connected to the frame 50 of the movable part P2 and the holder 70 of the movable part P2. Therefore, the third elastic element 110 essentially "suspends" the frame 50 together with the holder 70 of the movable part P2 between the case 10 and the bottom 140 of the fixed part P1, so that the frame 50 and the holder 70 are both separated by a distance apart from the case 10 and the bottom 140. That is, the frame 50 and the holder 70 are not in direct contact with the case 10 and the bottom 140. With the flexible third elastic element 110, the movement of the frame 50 of the movable part P2 and the holder 70 of the movable part P2 relative to the case 10 of the fixed part P1 and the bottom 140 of the fixed part P1 are mostly two-dimensional in directions that are perpendicular to the optical axis O.

Both the first elastic element 20 and the third elastic element 110 are electrically connected to the driving assembly D. The driving assembly D may drive the optical element 2 to move or rotate. Specifically, the holder 70 together with the optical element 2 therein may move relative to the frame 50 in a direction that is parallel with the optical axis O. Therefore, the movement of the holder 70 together with the optical element 2 relative to the frame 50 may achieve autofocus (AF) basically. As described above, the movement of the frame 50 together with the holder 70 therein relative to the bottom 140 are mostly two-dimensional in directions that are perpendicular to the optical axis O. Therefore, the movement of the frame 50 together with the holder 70 relative to the bottom 140 may achieve optical image stabilization (OIS) basically. In other words, the holder 70 is movably connected to the frame 50, and the frame 50 is movably connected to the fixed part P1.

How the driving assembly D achieves autofocus (AF) and optical image stabilization (OIS) will be explained in detail. The AF coil 80 is polygonal, surrounding the holder 70. The OIS coil 130 is disposed in the circuit board 120. The magnetic element 90 may be a multi-pole magnet or multiple glued magnets. Each pair of magnetic poles (one pair of N-pole, S-pole) of the magnetic element 90 are arranged along a direction that is perpendicular to the main axis M. The four magnetic elements 90 correspond to the AF coil 80 and the four OIS coils 130 at the same time. In this embodiment, since there is no need for providing two sets of magnetic elements to achieve autofocus (AF) and optical image stabilization (OIS) respectively and only one set of the magnetic elements 90 is needed to achieve autofocus (AF) and optical image stabilization (OIS) at the same time, the volume of the optical element driving mechanism 1 may be reduced and miniaturization is achieved.

When a current is supplied to the driving assembly D, the magnetic force generated between the AF coil 80 and the magnetic elements 90 is parallel with the optical axis O for driving the holder 70 and the optical element 2 therein to move along a direction that is parallel with the optical axis O so as to achieve autofocus (AF).

When a current is supplied to the driving assembly D, the magnetic force generated between the OIS coils 130 and the magnetic elements 90 is perpendicular to the optical axis O for driving the frame 50, the holder 70 and the optical element 2 therein to move along a direction that is perpendicular to the optical axis O so as to achieve optical image stabilization (OIS).

The AF sensing element 30 of the sensing assembly S is disposed on the frame 50 and the OIS sensing element 160 of the sensing assembly S is disposed on the bottom 140. The AF sensing element 30 may sense the movement of the holder 70 relative to the frame 50 along a direction that is parallel with the optical axis O. The OIS sensing element 160 may sense the movement of the holder 70 relative to the bottom 140 along a direction that is perpendicular to the optical axis O. In this embodiment, the sensing assembly S includes two OIS sensing elements 160 for sensing the movement of the holder 70 relative to the bottom 140 along the X-axis and along the Y-axis, respectively.

In general, the AF sensing element 30 may be a Hall sensor, a giant magnetoresistive (GMR) sensor, a tunneling magnetoresistive (TMR) sensor, etc. A Hall sensor, a GMR sensor, or a TMR sensor means that other elements such as an amplifier circuit, a temperature-compensation circuit, and a power voltage-stabilization circuit are integrated into the sensor in addition to the Hall element, the GMR element, and the TMR element. Such a sensor is referred to as an All-in-One integrated circuit (All-in-One IC). After current is supplied to an All-in-One IC, the All-in-One IC may supply the current to the other elements. Additionally, the All-in-One IC has the ability to control other elements. As for the OIS sensing element 160, it is a Hall element, a GMR element, a TMR element, etc., to which a current has to be supplied and it may not supply the current to the other elements nor have the ability to control other elements.

The description related to the AF sensing element 30 and the OIS sensing element 160 is provided to illustrate the difference between a Hall sensor/a GMR sensor/a TMR sensor and a Hall element/a GMR element/a TMR element, and it is not limited thereto. For example, the AF sensing element 30 may be a Hall element and the OIS sensing element 160 may be an All-in-One IC.

The reference element 60 is disposed on the holder 70. The reference element 60 may be a magnetic element, such as a magnet. When the holder 70 moves, the adjacent reference element 60 also moves with the holder 70, and thus the magnetic field of the reference element 60 changes accordingly. The change of the magnetic field of the reference element 60 may be detected by the AF sensing element 30, and thus the movement of the holder 70 along a direction that is parallel with the optical axis O may be obtained.

The change of the magnetic field of the reference element 60 may be converted to signals through the AF sensing element 30. The signals may be output to a control unit 170 (e.g. a central processing unit (CPU)) outside the optical element driving mechanism 1 or processed internally by the AF sensing element 30, and thus the position of the holder 70 is obtained. In order to correct the position of the holder 70, the signal is input to the AF sensing element 30 by the control unit 170. Alternatively, the position of the holder 70 may be adjusted directly by the AF sensing element 30 and the movement of the holder 70 may be controlled directly by the AF sensing element 30.

The AF sensing element 30 includes six pins. Two pins are used for power input to provide current for the AF sensing element 30. Two pins are used for signal input and output, including inputting signals from the control unit 170 and outputting signals to the control unit 170. Two pins are used for power supply to provide current to the AF coil 80 of the driving assembly D to achieve autofocus function. In other words, among the six pins of the AF sensing element 30, four pins are electrically connected to elements outside the optical element driving mechanism 1, and two pins are electrically connected to the elements (the AF coil 80 in this embodiment) inside the optical element driving mechanism 1.

Figure 3:
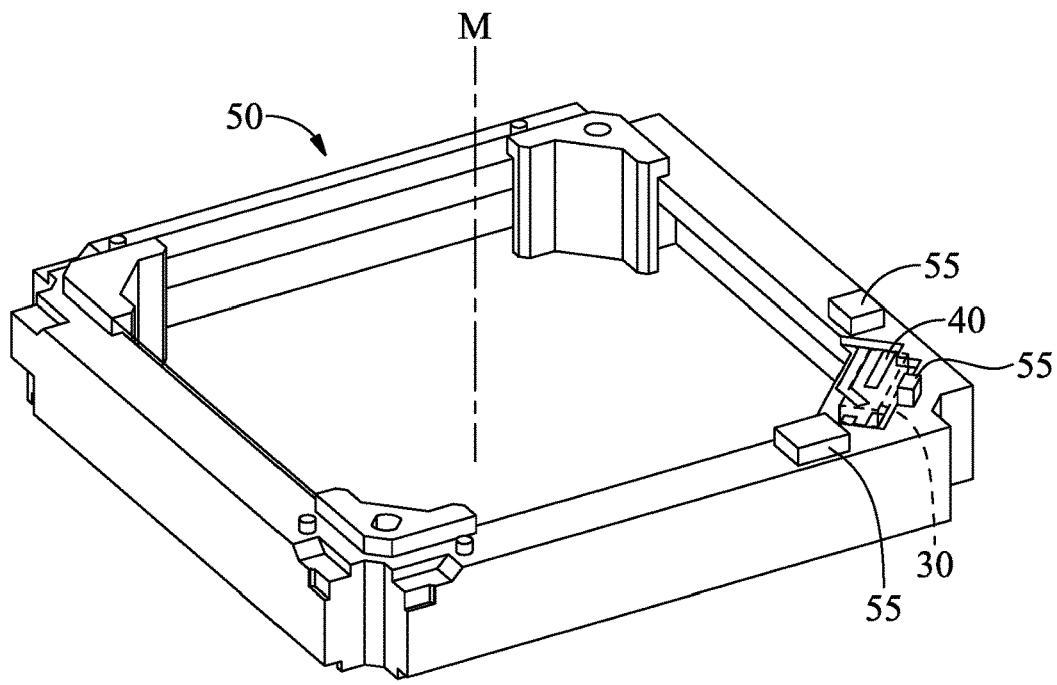
FIG. 3 is a schematic view of a frame provided with a circuit assembly.

FIG. 3 is a schematic view of the frame 50 provided with the circuit assembly 40. In FIG. 3, the AF sensing element 30 is illustrated in dotted lines. A portion of the circuit assembly 40 is embedded in the frame 50, and the other portions are revealed from the frame 50. As shown in FIG. 3, the AF sensing element 30 is electrically connected to the portion of the circuit assembly 40 revealed from the frame 50.

In order to protect the AF sensing element 30, the frame 50 further includes three stopping assemblies 55 disposed adjacent to the AF sensing element 30 to prevent the AF sensing element 30 from contacting the case 10. For example, the AF sensing element 30 may be disposed between the stopping assemblies 55. The stopping assemblies 55 protrude farther than the AF sensing element 30, i.e. the top surfaces of each of the stopping assemblies 55 are closer to the case 10 than the top surface of the AF sensing element 30. In some embodiments, the frame 50 may be located in an extreme position to contact the case 10, under such circumstances, the stopping assemblies 55 of the frame 50 contact the case 10 first, so the AF sensing element 30 does not contact the case 10 to prevent the AF sensing element 30 from being damaged. Optionally, the case 10 may also include one or more stopping assembly to prevent the AF sensing element 30 from contacting the case 10.

Figure 4:
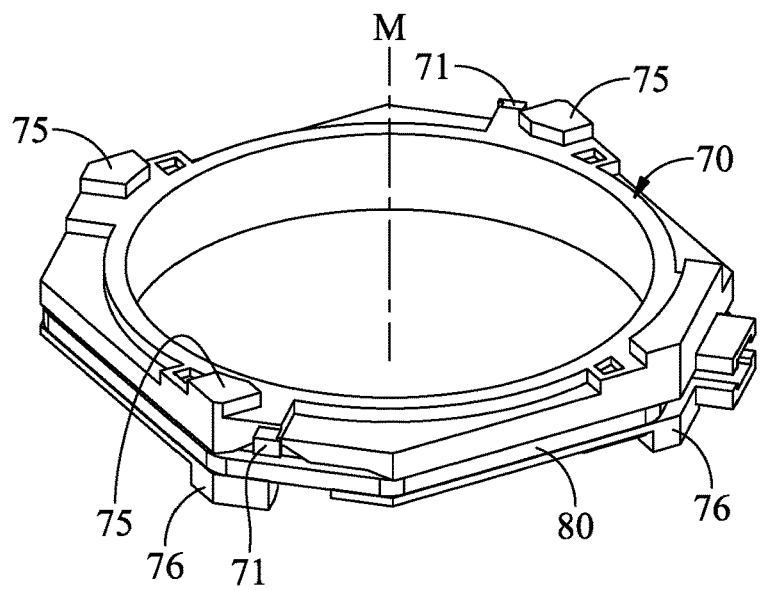
FIG. 4 is a perspective view of a holder and an AF coil.

FIG. 4 is a perspective view of the holder 70 and the AF coil 80. The holder 70 includes a plurality of upper stopping portions 75 and a plurality of lower stopping portions 76. When viewed in a direction that is perpendicular to the main axis M, the upper stopping portions 75 and the lower stopping portions 76 are located on different sides of the holder 70. The upper stopping portions 75 are closer to the light entrance than the lower stopping portions 76.

When the driving assembly D drives the holder 70 to move along a direction that is parallel with the optical axis O to an extreme position, the upper stopping portions 75 contact the case 10 or the lower stopping portions 76 contact the bottom 140. Therefore, the rest of the holder 70 will not contact the case 10 or the bottom 140 and the rest of the holder 70 may be prevented from colliding with the case 10 or the bottom 140. To sum up, the upper stopping portions 75 may restrict the movement of the holder 70 relative to the case 10 and the lower stopping portions 76 may restrict the movement of the holder 70 relative to the bottom 140.

It should be noted that the number and the positions of the stopping assemblies 55 of the frame 50, the upper stopping portions 75 and the lower stopping portions 76 of the holder 70 may be adjusted. For example, in order to effectively disperse the collision force and improve the overall stability of the optical element driving mechanism 1, three or more upper stopping portions 75 or lower stopping portions 76 may be provided, respectively.

In addition, as shown in FIG. 4, the holder 70 includes two electrical connection portions 71 disposed on two opposite sides of the holder 70 close to the light exit. The electrical connection portions 71 are used for electrically connected to the AF coil 80 of the driving assembly D. A portion of the AF coil 80 extends from the AF coil 80 and surrounds the electrical connection portions 71. By soldering on the electrical connection portions 71 and the like, the AF coil 80 may be electrically connected to other elements, e.g. the first elastic element 20.

In detail, the current flows into the optical element driving mechanism 1 starting from the external electrical connection portion 150. Then, the current flows through the circuit provided in the bottom 140, the third elastic element 110, the first elastic element 20, and the circuit assembly 40 in the frame 50 to supply power to the AF sensing element 30. As described above, in this embodiment, the AF sensing element 30 may supply power to other elements. The current supplied by the AF sensing element 30 flows through the first elastic element 20 and the electrical connection portions 71 to apply the current to the AF coil 80 of the driving assembly D. Therefore, the magnetic force may be generated between the AF coil 80 and the magnetic element 90, so that the holder 70 may move along a direction that is parallel with the optical axis O relative to the frame 50 to achieve autofocus (AF).

Figure 5:
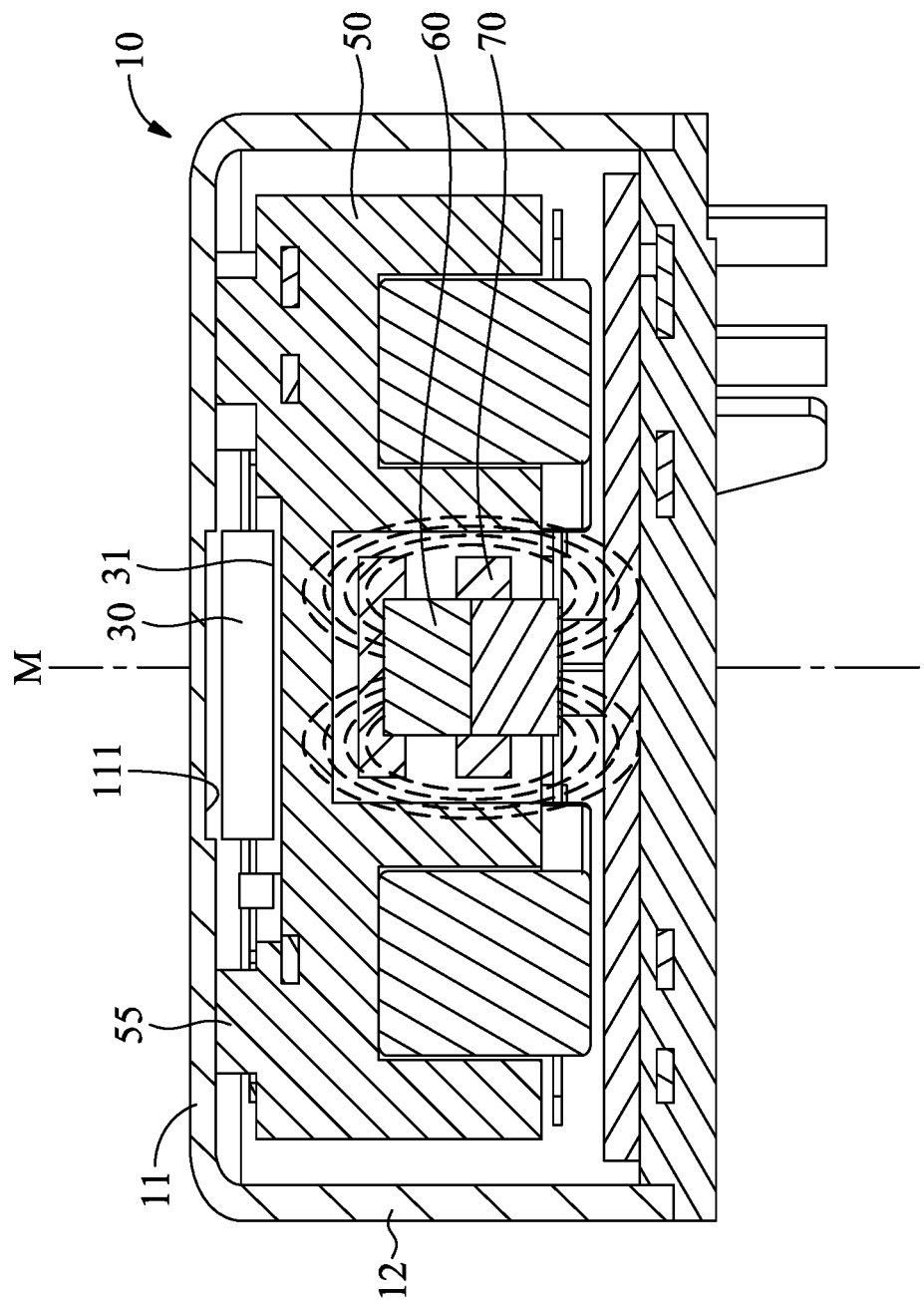
FIG. 5 is a cross-sectional view of the optical element driving mechanism along line A-A' of FIG. 1.

FIG. 5 is a cross-sectional view of the optical element driving mechanism 1 along line A-A' of FIG. 1 and FIG. 5 is used for clarifying the configuration of the AF sensing element 30 and the reference element 60. When viewed along the main axis M, the AF sensing element 30 at least partially overlaps the reference element 60. The top wall 11 of the case 10 includes a recess 111 corresponding to the AF sensing element 30. The AF sensing element 30 is disposed on the surface of the frame 50 that is perpendicular to the main axis M. As shown in FIG. 5, the case 10 and the AF sensing element 30 are located a distance apart.

The AF sensing element 30 includes a surface 31 corresponding to the reference element 60. When the holder 70 moves, the change of the magnetic lines of force of the reference element 60 may be sensed by the surface 31. In FIG. 5, the magnetic lines of force are shown in dashed lines. If there is no influence or interference, the magnetic lines of force are closed curves that are not intersected. When the holder 70 moves toward the top wall 11 of the case 10, the density of the magnetic lines of force from the reference element 60 sensed by the surface 31 increases. To the contrary, when the holder 70 moves away from the top wall 11 of the case 10, the density of the magnetic lines of force from the reference element 60 sensed by the surface 31 decreases. The change of the density of the magnetic lines of force from the reference element 60 is sensed by the AF sensing element 30, so the position of the reference element 60 may be known, thereby the position of the holder 70 may be known.

It should be noted that when the displacement correction of optical image stabilization is conducted, the frame 50 moves in a direction that is perpendicular to the optical axis O together with the holder 70 therein. Since the AF sensing element 30 is disposed on the frame 50 and the reference element 60 is disposed on the holder 70, the movement of the AF sensing element 30 in a direction that is perpendicular to the optical axis O (OIS) is substantially the same as that of the reference element 60. Therefore, the difference of the movement between the AF sensing element 30 and the reference element 60 is in a direction that is parallel with the optical axis O (AF). That is, when the AF sensing element 30 detects the change of the magnetic field of the reference element 60, the AF sensing element 30 may effectively detect the movement of the holder 70 in a direction parallel with the optical axis O (AF) instead of detecting the movement of the holder 70 in a direction that is perpendicular to the optical axis O (OIS).

Figure 6:
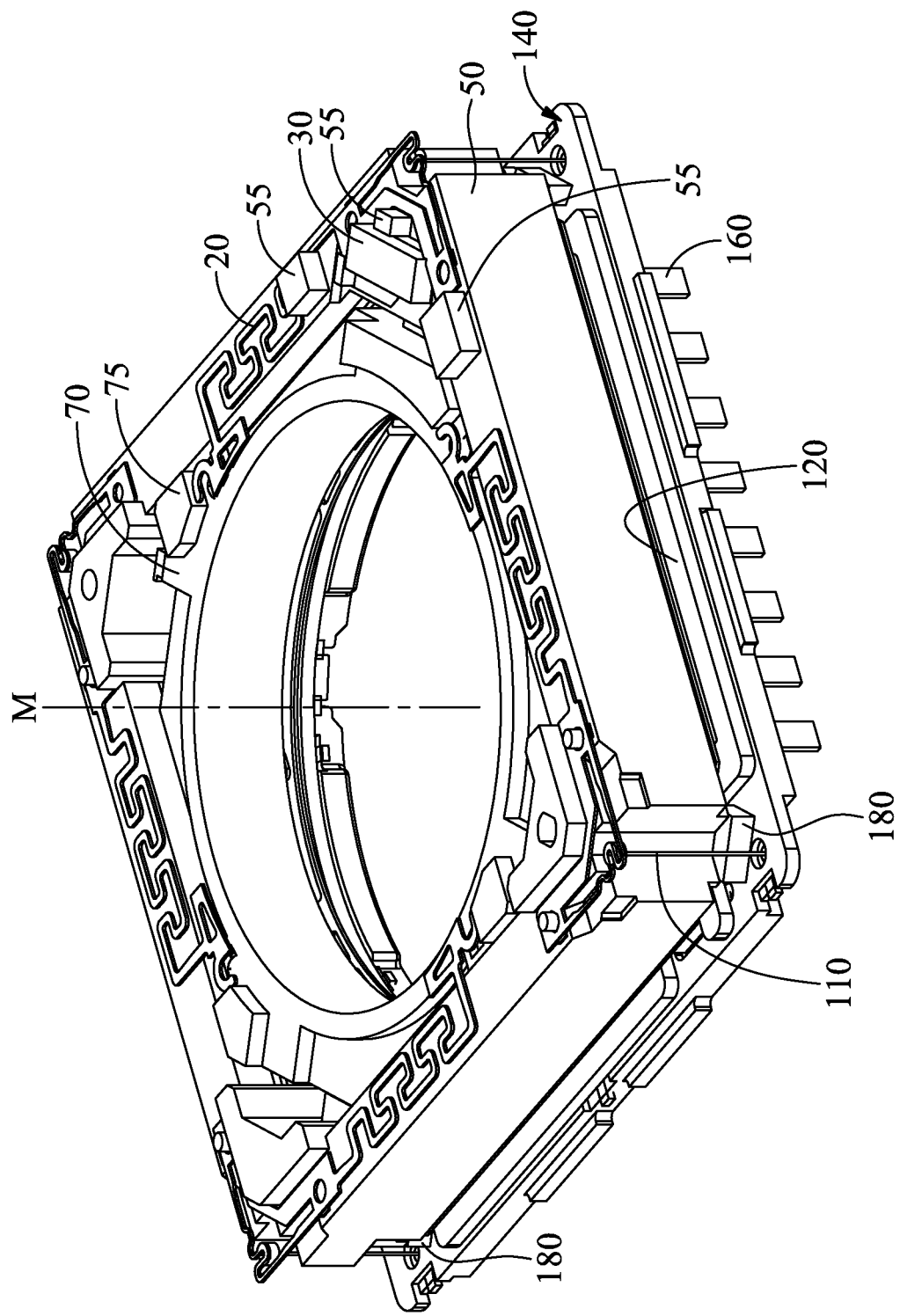
FIG. 6 is a perspective view of the optical element driving mechanism with the case omitted.
Figure 7:
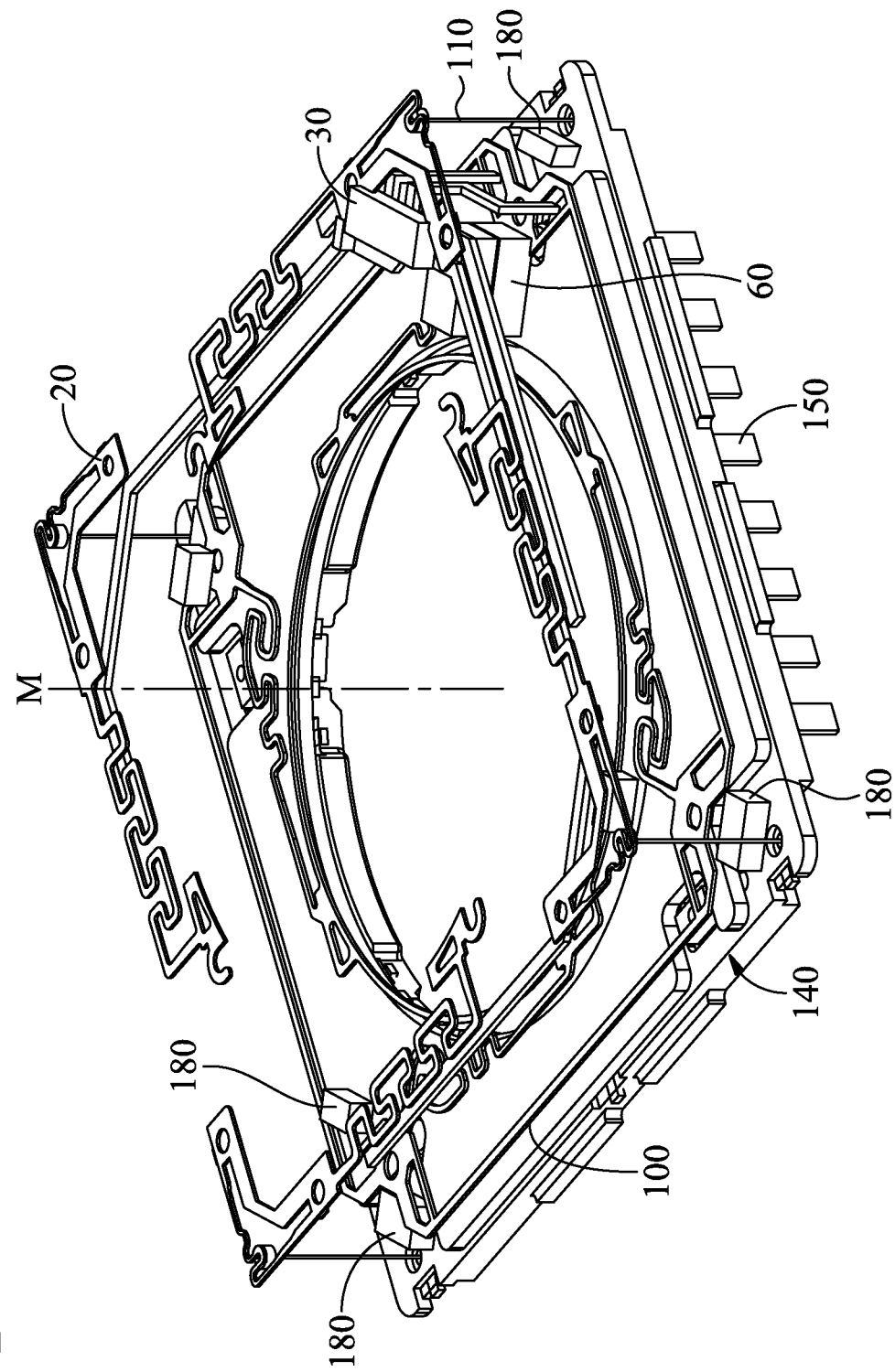
FIG. 7 is a perspective view of the optical element driving mechanism with the case, the frame, and the holder omitted.
Figure 8:
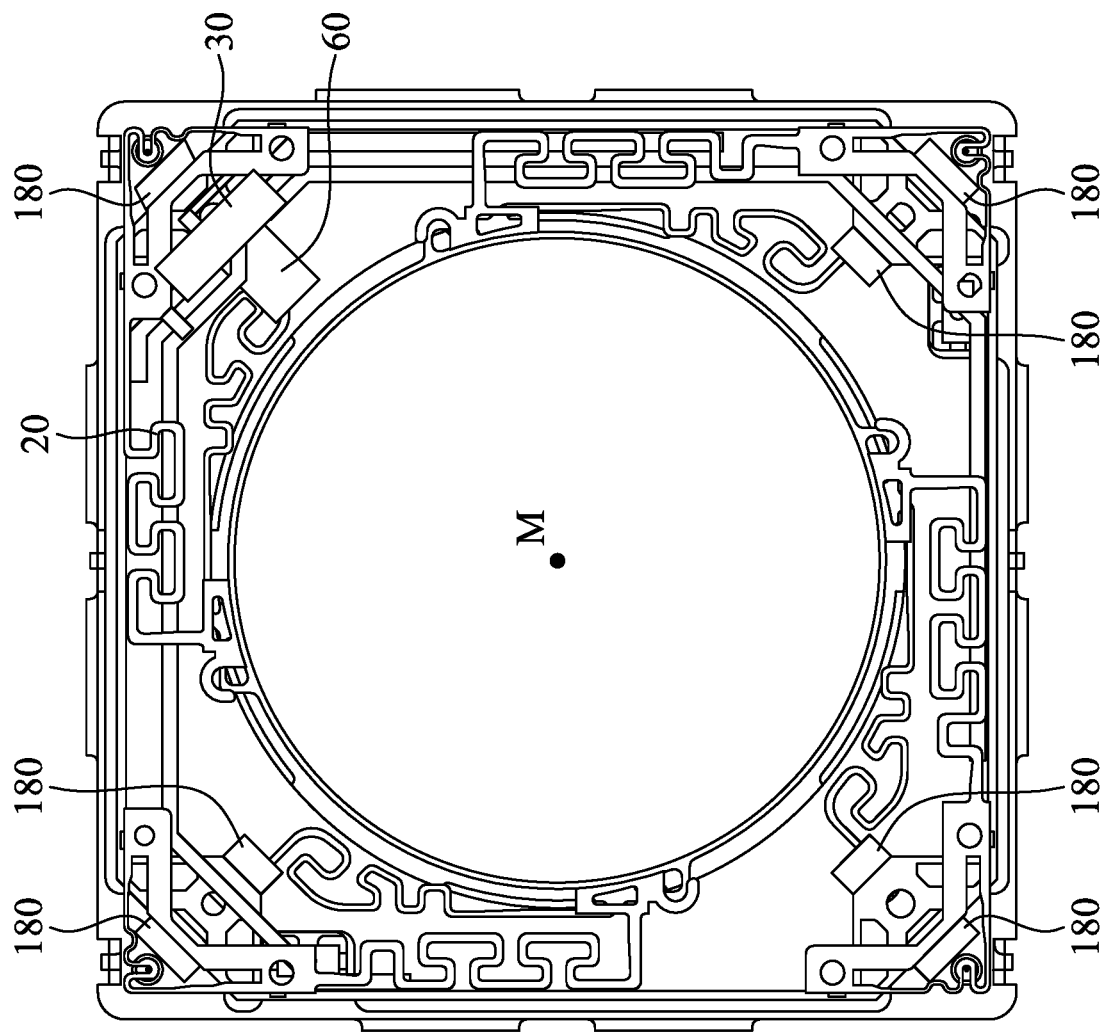
FIG. 8 is a top view of the optical element driving mechanism with the case, the frame, and the holder omitted.

FIG. 6 is a perspective view of the optical element driving mechanism 1 with the case 10 omitted. FIG. 7 is a perspective view of the optical element driving mechanism 1 with the case 10, the frame 50, and the holder 70 omitted. FIG. 8 is a top view of the optical element driving mechanism 1 with the case 10, the frame 50, and the holder 70 omitted. As shown in FIG. 6 to FIG. 8, the AF sensing element 30 is disposed on the corner of the frame 50 close to where the light enters (a light entrance) in this embodiment may be clearly seen. Compared to the situation that the AF sensing element 30 is disposed on the side of the frame 50, such configuration may reduce the volume of the optical element driving mechanism 1 in the plane that is perpendicular to the main axis M. When viewed in a direction that is perpendicular to the main axis M, the first elastic element 20 at least partially overlaps the AF sensing element 30.

In some embodiments, the optical element driving mechanism 1 further includes a plurality of damping elements 180. The damping elements 180 are made of a material that may absorb shock and may inhibit vibration, such as a gel. The damping element 180 may be disposed between the frame 50 and the case 10, in particular, between the AF sensing element 30 and the case 10. Alternatively, the damping element 180 may be disposed between the holder 70 and the frame 50. When the optical element driving mechanism 1 is impacted by an external force, the damping element 180 may prevent a severe collision between the frame 50 and the case 10 or between the holder 70 and the frame 50. Furthermore, the damping element 180 may help the frame 50 and the holder 70 to return to their original positions quickly when they are impacted and may prevent the optical element 2 in the holder 70 from being unstable. Therefore, the damping element 180 may improve the reaction time and the accuracy of the frame 50 and the holder 70 during their movement.

Based on the present disclosure, when the optical element driving mechanism works, the sensing assembly is able to sense the movement of the holder relative to the frame and control the driving assembly to achieve closed-loop feedback. The sensing element disposed on the corner of the frame and the magnetic elements corresponding to the AF coil and the OIS coil at the same time may achieve miniaturization. In addition, the circuit assembly is formed in the frame by insert molding, so that the frame may protect the circuit assembly and the magnetic elements.

The second group of embodiments.

Figure 9:
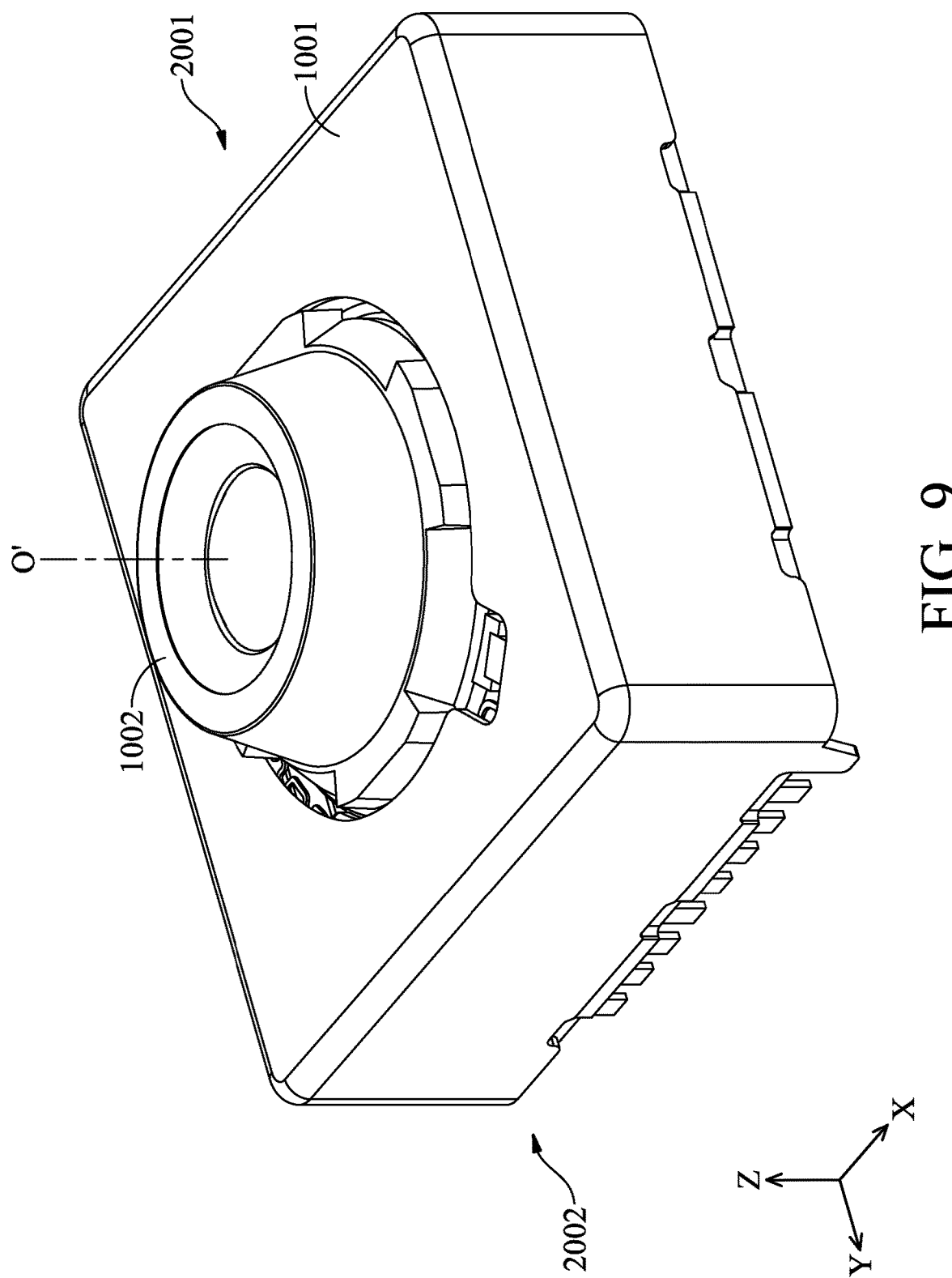
FIG. 9 is a perspective view of an optical element driving mechanism and an optical element according to some embodiments of the present disclosure.
Figure 10:
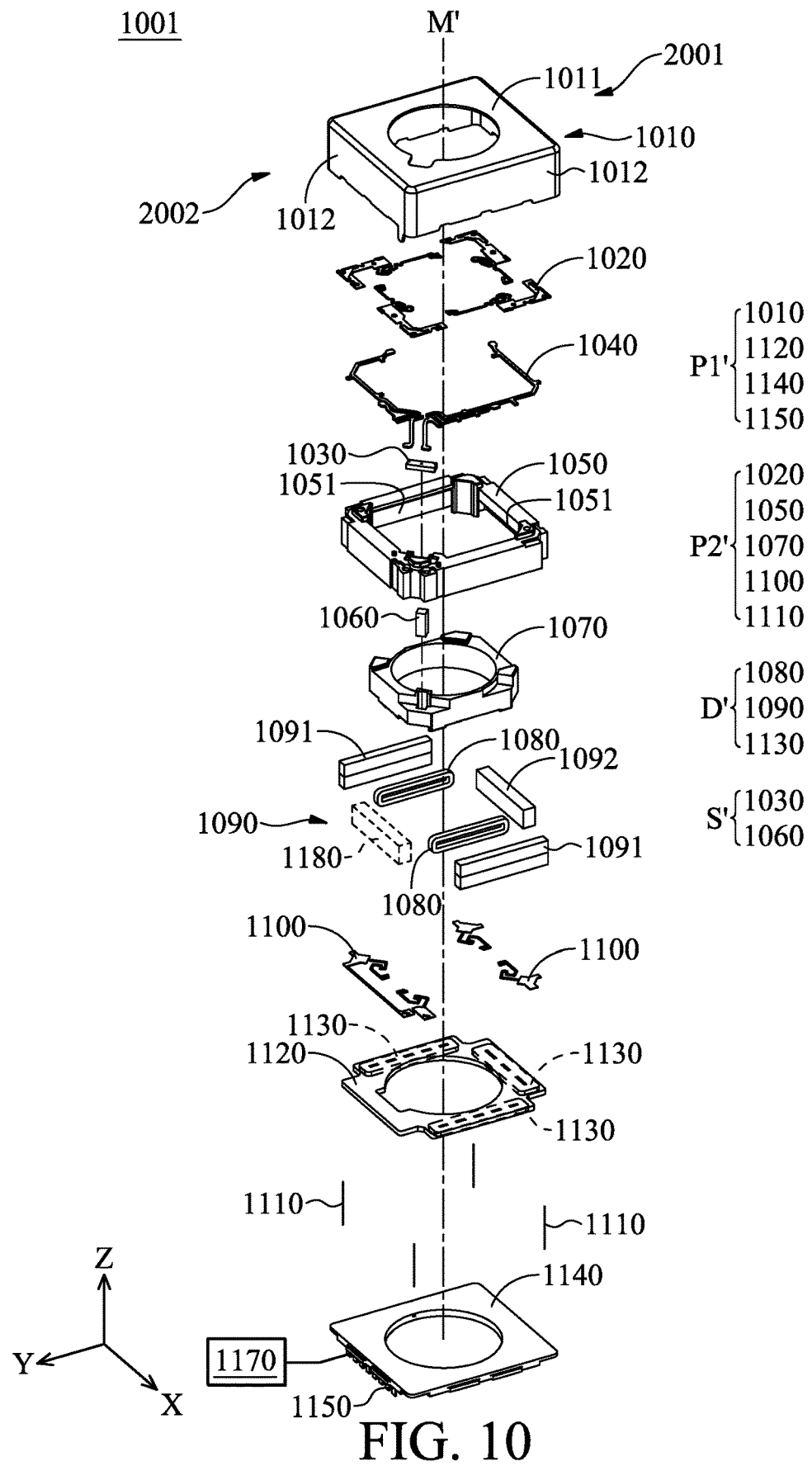
FIG. 10 is an exploded view of the optical element driving mechanism of FIG. 9.

First, please refer to FIG. 9 and FIG. 10. FIG. 9 is a perspective view of an optical element driving mechanism 1001 and an optical element 1002 according to some embodiments of the present disclosure. FIG. 10 is an exploded view of the optical element driving mechanism 1001 of FIG. 9. The optical element 1002 includes an optical axis O'. The optical axis O' is a virtual axis passing through the center of the optical element 1002. The optical element driving mechanism 1001 includes a main axis M'. The main axis M' is a virtual axis passing through the center of the optical element driving mechanism 1001. When the optical element driving mechanism 1001, the optical element 1002 and a photosensitive element (not shown) (e.g. charge-coupled detector, CCD) are aligned, the optical axis O' of the optical element 1002 coincides the main axis M' of the optical element driving mechanism 1001.

The optical element driving mechanism 1001 includes a fixed part P1', a movable part P2', a driving assembly D', and a sensing assembly S'. The movable part P2' may hold the optical element 1002. The movable part P2' is movably connected to the fixed part P1' so that the movable part P2' may move relative to the fixed part P1'. The driving assembly D' may drive the movable part P2' to move relative to the fixed part P1'. The sensing assembly S' senses the movement of the movable part P2' relative to the fixed part P1'.

The fixed part P1' includes a case 1010, a circuit board 1120, a bottom 1140, and an external electrical connection portion 1150. The movable part P2' includes four first elastic elements 1020, a frame 1050, a holder 1070, two second elastic elements 1100, and four third elastic elements 1110. The driving assembly D' includes two coils 1080, a magnetic assembly 1090, and a coil assembly 1130. The sensing assembly S' includes an AF sensing element 1030, a reference element 1060, and two OIS sensing elements 1160

Figure 17:
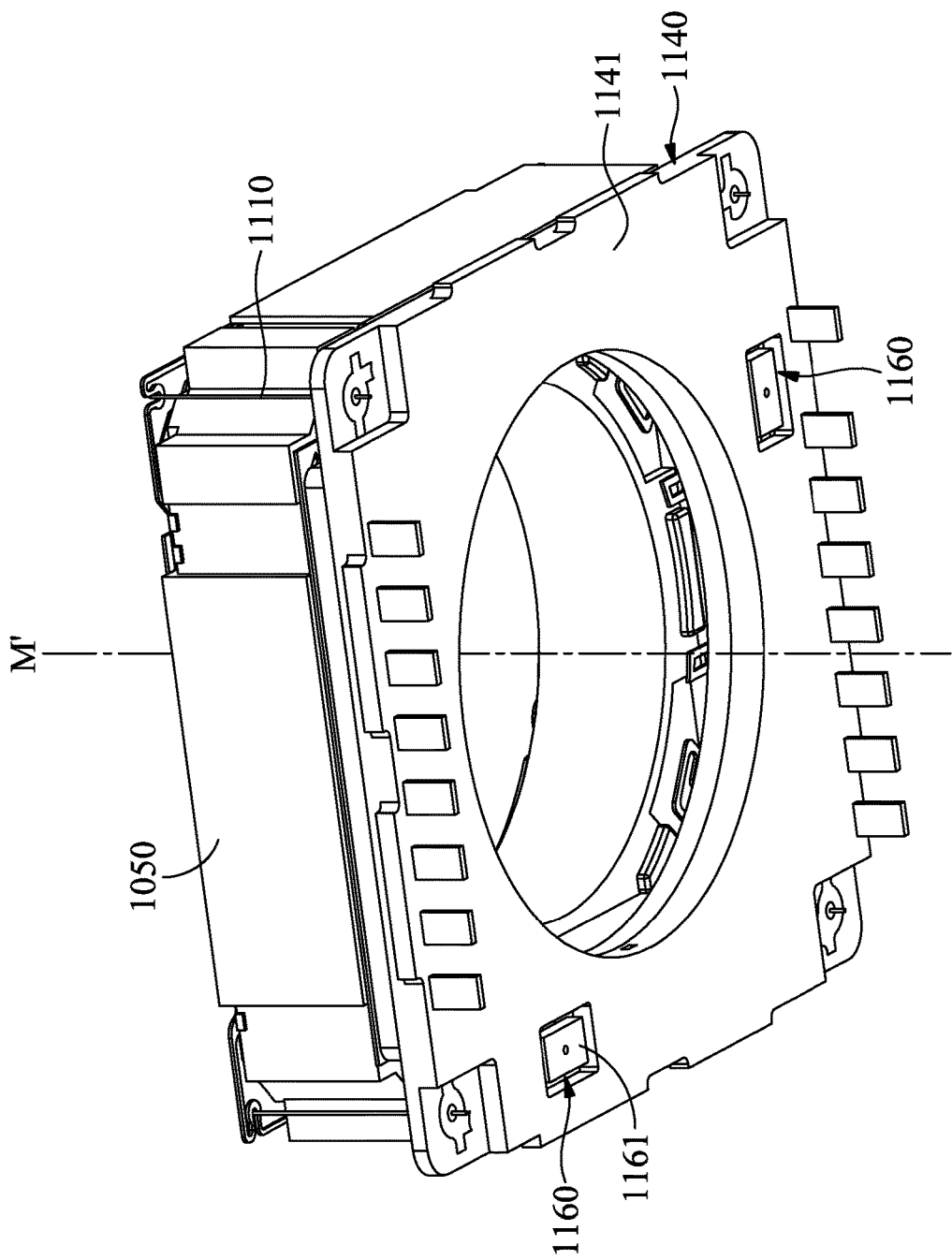
Figure 18:
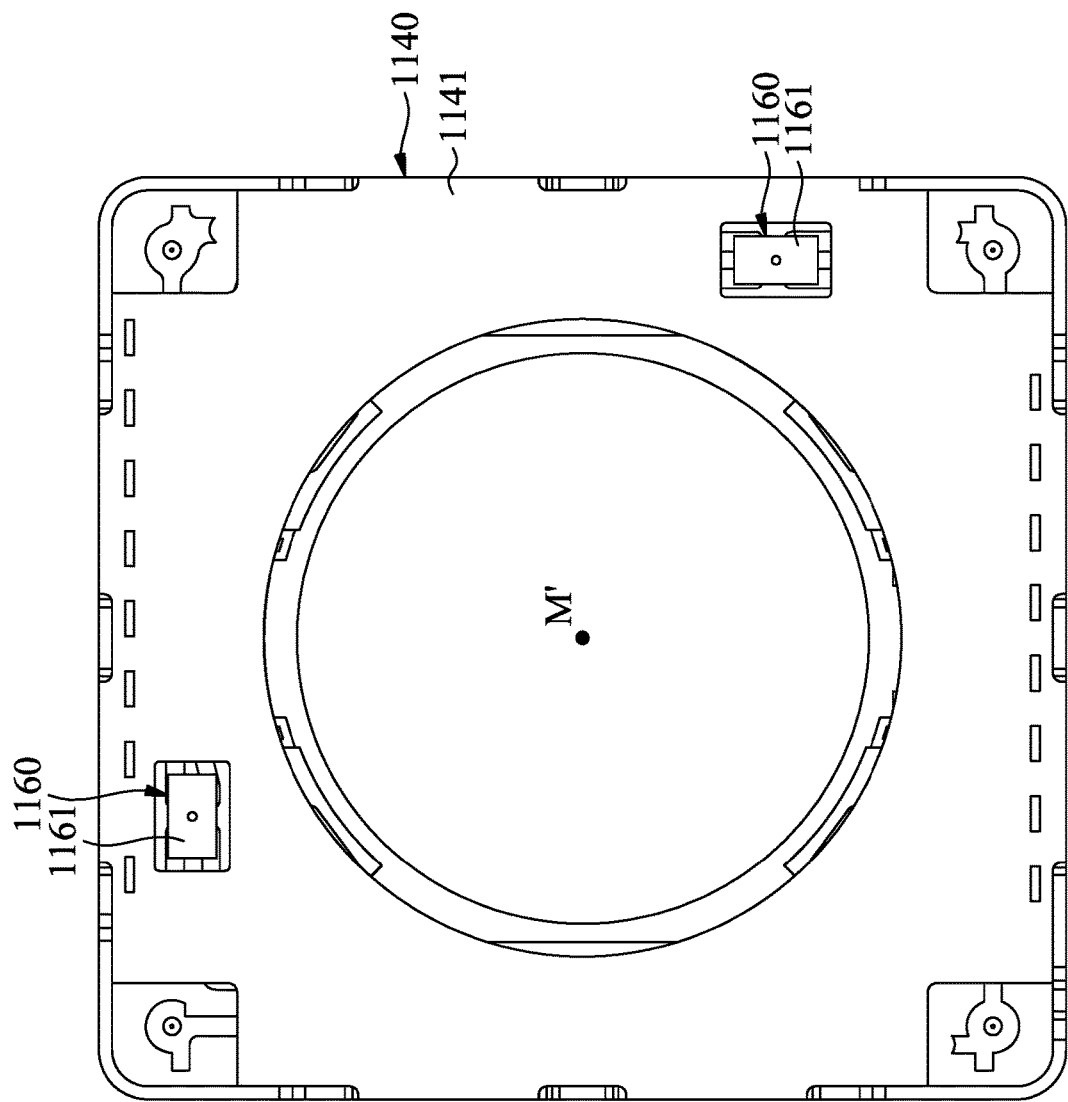
FIG. 18 is a bottom view of the optical element driving mechanism.

(shown in FIG. 17 and FIG. 18, but not shown in FIG. 10). The elements may be added or omitted according to users' needs.

The case 1010, the circuit board 1120, and the bottom 1140 of the fixed part P1' are sequentially arranged along the main axis M'. The case 1010 has a top wall 1011 and four side walls 1012. The top wall 1011 is perpendicular to the main axis M'. Compared to the bottom 1140, the top wall 1011 is closer to where a light enters (a light entrance). The side walls 1012 extend from an edge of the top wall 1011 along the main axis M'. The case 1010 is located above the circuit board 1120 and the bottom 1140. The side walls 1012 of the case 1010 may be connected to the bottom 1140 by soldering or welding, etc. The movable part P2', the sensing assembly S', the driving assembly D', and the sensing assembly S', etc. may be accommodated in the space formed therein. When viewed along the main axis M', the fixed part P1' formed by the connection of the case 1010 and the bottom 1140 is polygonal, such as a rectangule or a square.

For clarity of illustration, one side of the optical element driving mechanism 1001 is defined as a first side 2001, and the side opposite to the first side 2001 is defined as a second side 2002. The second side 2002 is parallel with the first side 2001, and the main axis M' of the optical element driving mechanism 1001 is located between the first side 2001 and the second side 2002. An electromagnetic device (not shown), such as a receiver, an antenna, or other optical element driving mechanism(s), is placed outside the optical element driving mechanism 1001 and close to the second side 2002. Such electromagnetic devices may generate electromagnetic waves, magnetic attraction force, or magnetic repulsion force and thus cause magnetic interference to the optical element driving mechanism 1001.

The case 1010 is made of a metal or a non-metal material. The case 1010 may be made of magnetically permeable material having magnetic permeability, such as ferromagnetic material, including iron (Fe), nickel (Ni), cobalt (Co) or an alloy thereof, for focusing the magnetic force generated by the driving assembly D'.

The circuit board 1120 is disposed above the bottom 1140. The circuit board 1120 may be a flexible printed circuit (FPC), a flexible-hard composite board, etc. The circuit board 1120 may be provided with electronic elements such as a capacitor, a resistor, or an inductor. The bottom 1140 is provided with circuits (not shown), and the circuits are formed by insert molding in the bottom 1140.

The current is supplied to the optical element driving mechanism 1001 through the external electrical connection portion 1150. The external electrical connection portion 1150 may be connected to a power supply source (not shown) outside the optical element driving mechanism 1001. The external electrical connection portion 150 includes several pins for the current to flow in or flow out. The direction of the current is determined according to the direction of movement of the movable part P2' (for example, away from the bottom 1140 or toward the bottom 1140).

The first elastic element 1020, the frame 1050, the holder 1070, and the second elastic element 1100 of the movable part P2' are sequentially arranged along the main axis M'. The frame 1050 is made of a nonconductive material or a magnetically permeable material, such as plastic or metal alloy. When the frame 1050 is made of a magnetically permeable material, the frame 1050 may similarly have the functions of maintaining magnetic force and enhancing magnetic force. Additionally, the frame 1050 made of magnetically permeable material may have a higher structural strength than non-conductive material.

The outline of the frame 1050 is a polygonal, such as a rectangle or a square. The frame 1050 has four receiving holes 1051 to receive the magnetic elements 1090 and protect the magnetic elements 1090. The frame 1050 includes a circuit assembly 1040. The circuit assembly 1040 is formed inside the frame 1050 by insert molding. The circuit assembly 1040 has a three-dimensional structure and includes different pins that may be respectively used as a positive electrode and a negative electrode.

The holder 1070 is hollow for holding the optical element 1002. The holder 1070 and the optical element 1002 may be provided with corresponding screw structures so that the optical element 1002 is fixed to the holder 1070 better.

The first elastic element 1020 and the second elastic element 1100 of the movable part P2' are made of an elastic material or a ductile material, such as metal. In the art, the first elastic element 1020 and the second elastic element 1100 may be known as terms "spring", "spring leaf", "plate spring leaf", etc.

The first elastic element 1020 connects to a portion of the frame 1050 and the top surface of the holder 1070 and the second elastic element 1100 connects to a portion of the frame 1050 and the bottom surface of the holder 1070 in order to elastically clamp the holder 1070. When the movable part P2' moves relative to the fixed part P1', such elastic clamping by the first elastic element 1020 and the second elastic element 1100 may limit the movement range of the holder 1070 and prevent the holder 1070 and the optical element 1002 therein from being damaged because of the collision between the holder 1070 and the case 1010 or the bottom 1140 when the optical element driving mechanism 1001 moves or affected by an external force.

The upper ends of the four third elastic elements 1110 are respectively connected to the four first elastic elements 1020 of the movable part P2', and the lower ends of the four third elastic elements 1110 are connected to the four corners of the bottom 1140 of the fixed part P1'. As shown in FIG. 10, the four corners of the second elastic element 1100 and the four corners of the circuit board 1120 contract inwardly to provide space for the third elastic element 1110.

As described above, the first elastic element 1020 is connected to the frame 1050 of the movable part P2' and the holder 1070 of the movable part P2'. Therefore, the third elastic element 1110 essentially "suspends" the frame 1050 together with the holder 1070 of the movable part P2' between the case 1010 and the bottom 1140 of the fixed part P1, so that the frame 1050 and the holder 1070 are both separated by a distance apart from the case 1010 and the bottom 1140. That is, the frame 1050 and the holder 1070 are not in direct contact with the case 1010 and the bottom 1140.

Figure 11:
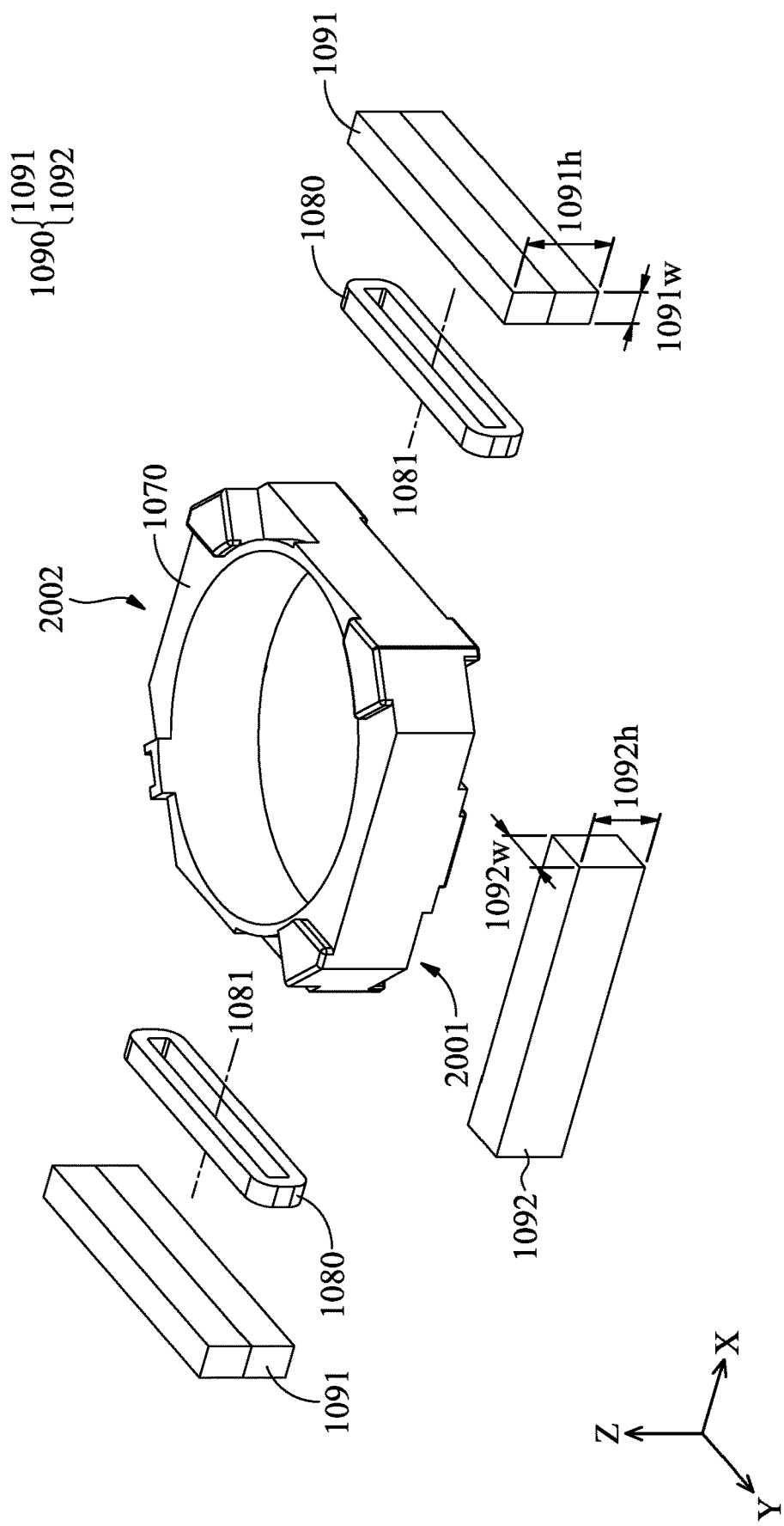
FIG. 11 is a schematic view of a holder, a coil, and a magnetic assembly.
Figure 12:
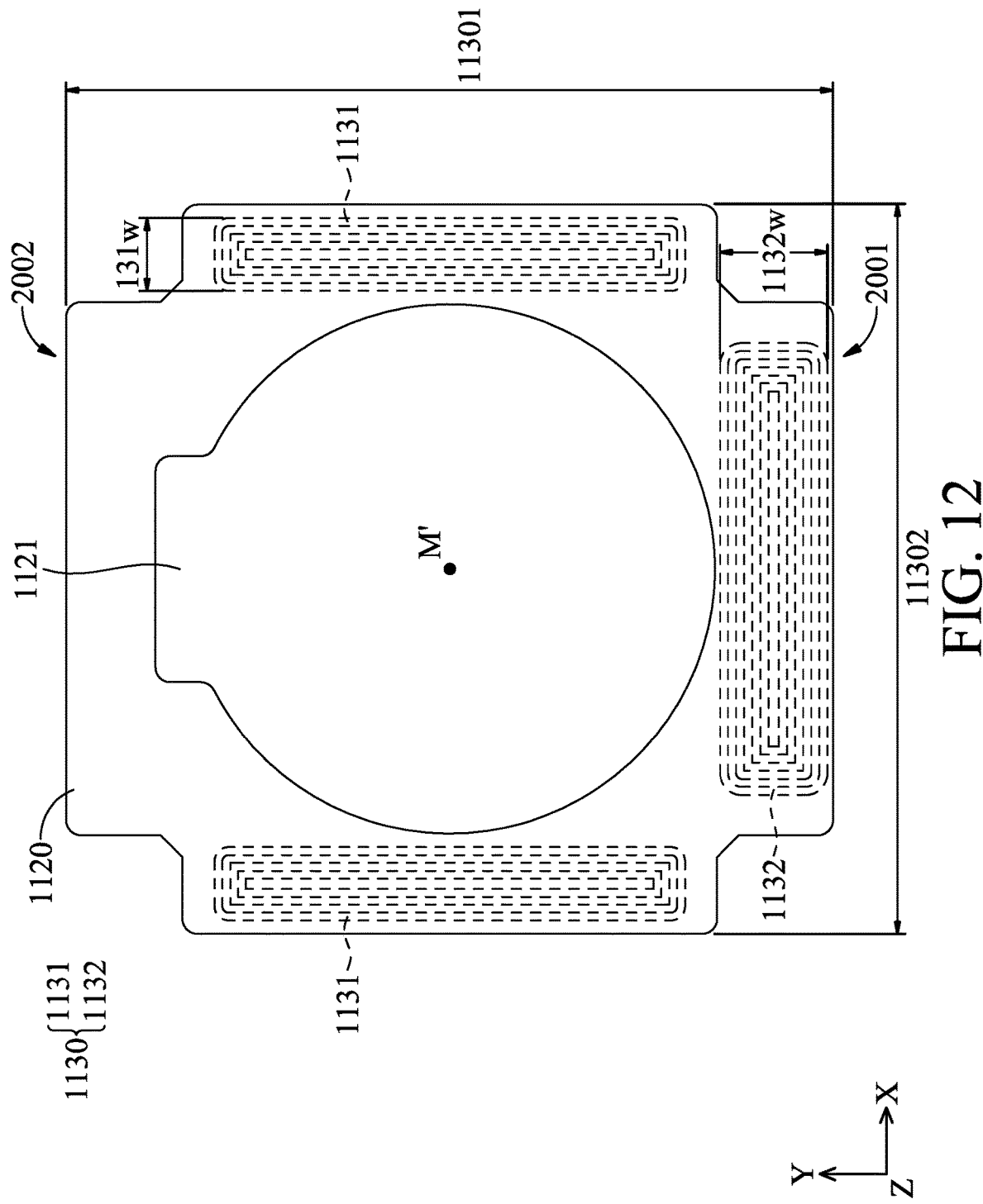
FIG. 12 is a top view of a circuit board and a coil assembly.

Next, please also refer to FIG. 11 and FIG. 12 to better understand the driving assembly D'. FIG. 11 is a schematic view of the holder 1070, the coil 1080, and the magnetic assembly 1090. FIG. 12 is a top view of the circuit board 1120 and the coil assembly 1130. The magnetic assembly 1090 includes two first magnetic elements 1091 and a second magnetic element 1092. The coil assembly 1130 includes two first coil groups 1131 corresponding to the first magnetic element 1091 and a second coil group 1132 corresponding to the second magnetic element 1092. The coil assembly 1130 is disposed in the circuit board 1120. Each of the first coil group 1131 and the second coil group 1132 are disposed on two adjacent sides of the circuit board 1120. It should be noted that no magnetic element or coil group is provided on the second side 2002 to prevent the electromagnetic device close to the second side 2002 from affecting the function of the magnetic element on the second side 2002.

The driving assembly D' may drive the optical element 1002 to move, including moving or rotating. According to different functions, the driving assembly D' may be further divided into an AF driving assembly for achieving AF and an OIS driving assembly for achieving OIS.

The AF driving assembly includes two coils 1080 and two first magnetic elements 1091 corresponding to the coils 1080. The coil 1080 is substantially elliptical. The two coils 1080 are disposed on two opposite sides of the holder 1070. A winding axis 1081 of each of the coil 1080 is perpendicular to the main axis M'. The direction of the current passing through the upper half of the coil 1080 is different than the direction of the current passing through the lower half of the coil 1080. To make the whole coil 1080 move toward the same direction, the upper half of the coil 1080 and the lower half of the coil 1080 require different directions of magnetic field. Therefore, the first magnetic element 1091 may be a multi-pole magnet or multiple glued magnets.

When a current is supplied to the driving assembly D, the magnetic force generated between the coil 1080 and the first magnetic element 1091 is parallel with the optical axis O' for driving the holder 1070 to move along a direction that is parallel with the optical axis O relative to the frame 1050, thereby driving the optical element 1002 therein to move along a direction that is parallel with the optical axis O, so as to achieve autofocus (AF).

The OIS driving assembly includes the magnetic assembly 1090 and the coil assembly 1130 corresponding to the magnetic assembly 1090. In other words, the OIS driving assembly includes the first magnetic elements 1091, the second magnetic element 1092, the first coil groups 1131, and the second coil group 1132.

When a current is supplied to the driving assembly D', the magnetic force generated between the coil assembly 1130 and the magnetic assembly 1090 is perpendicular to the optical axis O'. The frame 1050 may move in a direction that is perpendicular to the optical axis O' relative to the bottom 1140 and make the holder 1070 that is connected to the frame 1050 and the opticl element 1002 inside the holder 1070 move in a direction that is perpendicular to the optical axis O' (in the XY plane) due to the flexible third elastic element 1110 so as to achieve optical image stabilization (OIS) functionality. Specifically, the first magnetic elements 1091 and the first coil group 1131 may drive the frame 1050 to move along the X-axis, and the second magnetic element 1091 and the second coil group 1132 may drive the frame 1050 to move along the Y-axis.

Therefore, the movement of the holder 1070 relative to the frame 1050 may mainly achieve autofocus (AF), and the movement of the frame 1050 relative to the bottom 1140 may achieve optical image stabilization (OIS) functionality. In other words, the holder 1070 is movably connected to the frame 1050, and the frame 1050 is movably connected to the bottom 1140.

In this embodiment, the first magnetic element 1091 corresponds to the coil 1080 and the first coil group 1131 at the same time. As a result, there is no need for providing two sets of magnetic elements to achieve autofocus (AF) and optical image stabilization (OIS) respectively, and only one set of the magnetic assembly 1090 is needed to achieve autofocus (AF) and optical image stabilization (OIS) at the same time, the volume of the optical element driving mechanism 1001 may be reduced and miniaturization is achieved.

Also, the size of the first magnetic element 1091 may be different than the size of the second magnetic element 1092. Compared to the second magnetic element 1092 that only corresponds to the second coil group 1132, since the first magnetic element 1091 corresponds to the coil 1080 and the first coil group 1131 at the same time, the height of the first magnetic element 1091 has to be greater than the height of the second magnetic element 1092. That is, the size of the first magnetic element 1091 and the size of the second magnetic element 1092 in a direction that is parallel with the main axis M' are different. As shown in FIG. 11, a height 1091h of the first magnetic element 1091 is greater than a height 1092h of the second magnetic element 1092.

Moreover, since no magnetic element is placed on the second side 2002, when optical image stabilization is conducted, compared with the two first magnetic elements 1091, the single second magnetic element 1092 needs to have a greater width to generate a greater magnetic force. That is, the size of the first magnetic element 1091 and the size of the second magnetic element 1092 in a direction that is perpendicular to the main axis M' are different. As shown in FIG. 11, a width 1092w of the second magnetic element 1092 is greater than a width 1091w of the first magnetic element 1091.

For the same reason, since no coil group is placed on the second side 2002, compared with the two first coil groups 1131, the single second coil group 1132 needs a larger number of coils to generate a larger magnetic force. As shown in FIG. 12, the number of coils of the second coil group 1132 is greater than the number of coils of the first coil group 1131. In some embodiments, a width 1132w of the second coil group 1132 is greater than a width 1131w of the first coil group 1131.

It should be noted that the length of each side of the circuit board 1120 may be different. As shown in FIG. 12, the circuit board 1120 includes a Y-axis maximum size 11301 and an X-axis maximum size 11302. The Y-axis maximum size 11301 and the X-axis maximum size 11302 are perpendicular to each other. For example, the Y-axis maximum size 11301 is 11 mm, and the X-axis maximum size 11302 is 10.5 mm.

Please refer to FIG. 10 again. To make the center of gravity of the optical element driving mechanism 1001 maintain balanced, the weight of the elements on the first side 2001 may be substantially equal to the weight of the elements on the second side 2002. As a result, a balance weight piece 1180 may be disposed on the second side 2002 where no magnetic elements are placed. The balance weight piece 1180 is made of non-magnetic material, and the balance weight piece 1180 may be made of material that has a density similar to that of the magnetic assembly 1090, such as stainless steel, copper, and the like.

Figure 13:
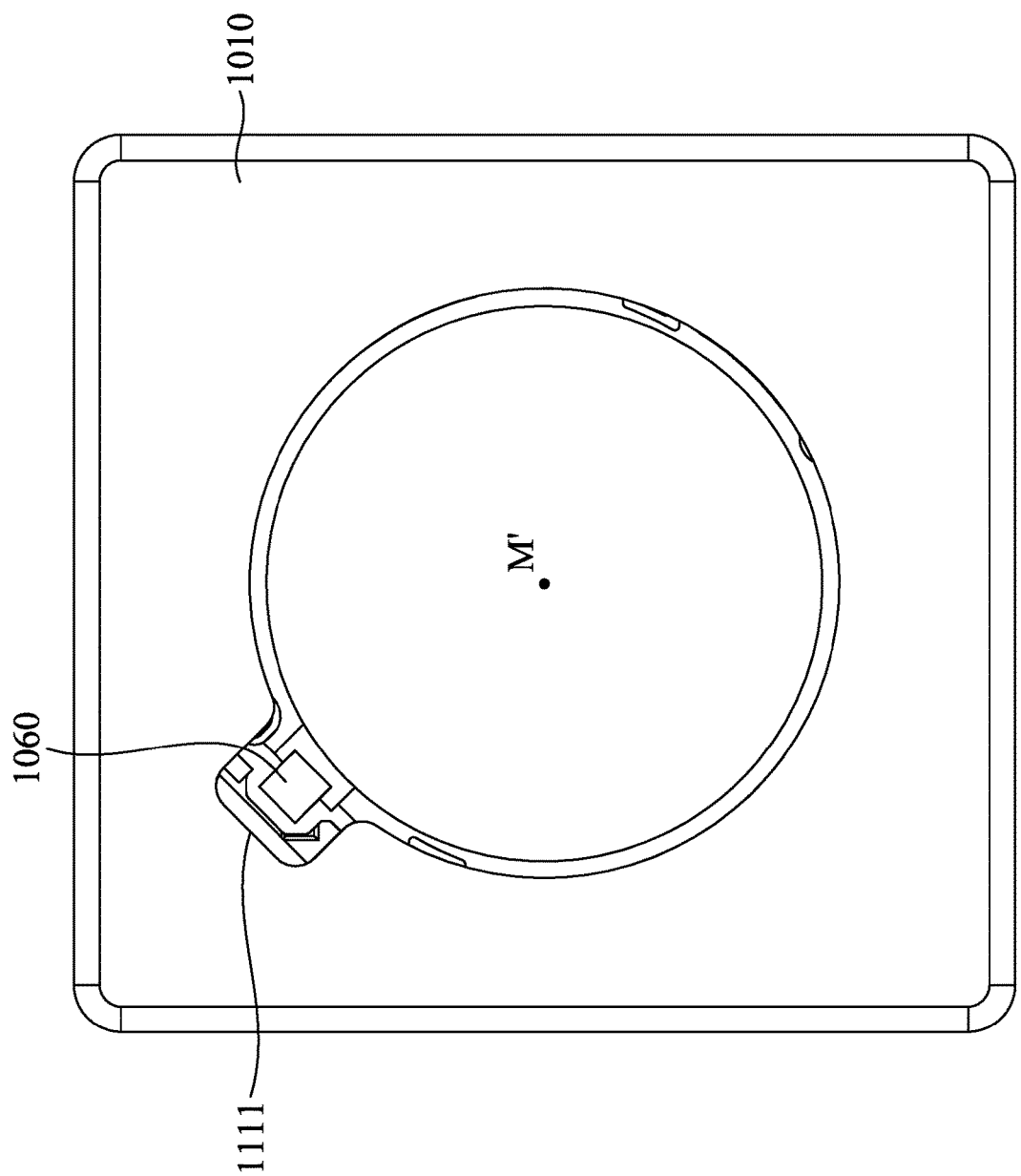
FIG. 13 is a top view of the optical element driving mechanism.
Figure 14:
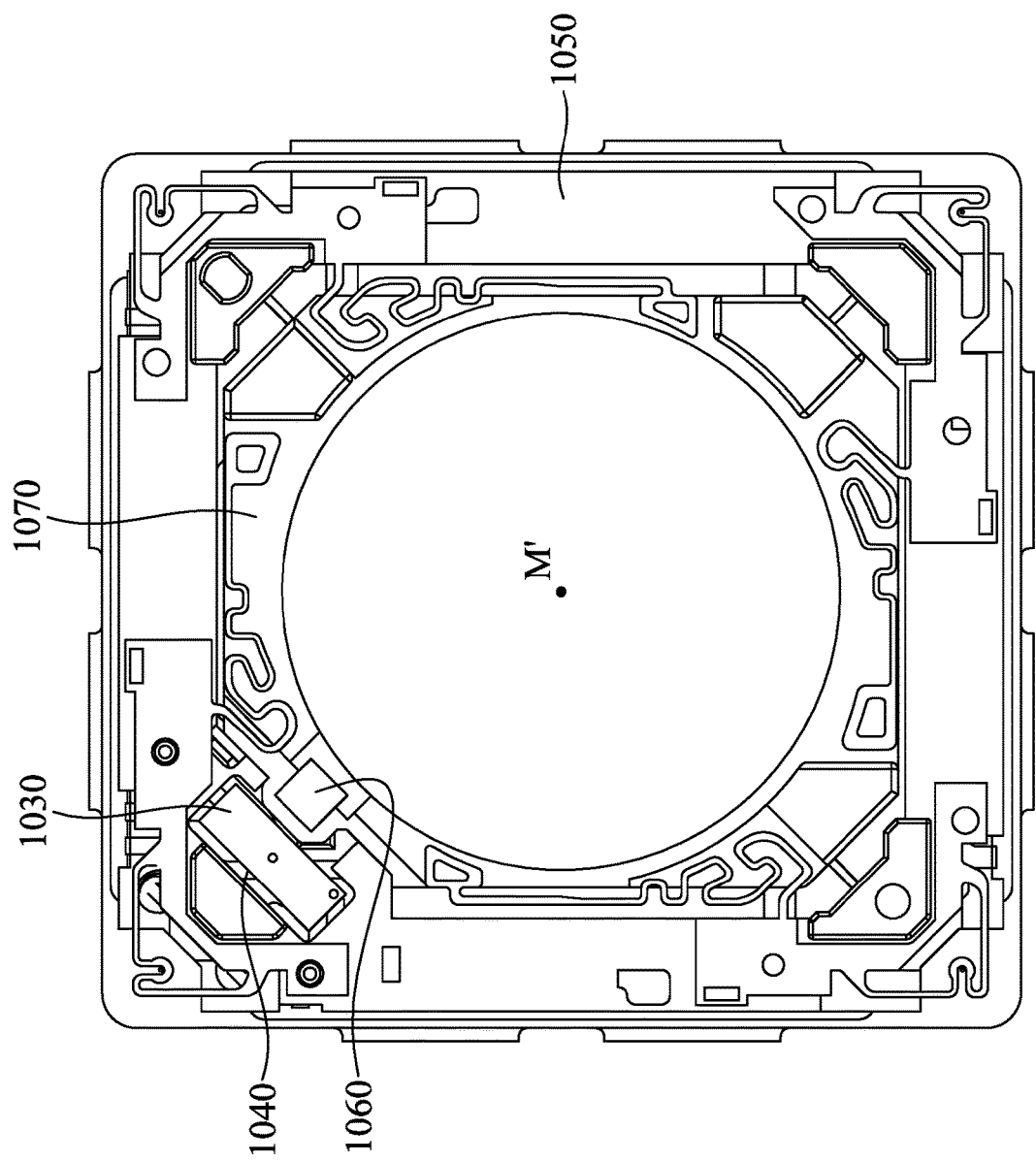
FIG. 14 is a top view of the optical element driving mechanism with a case omitted.
Figure 15:
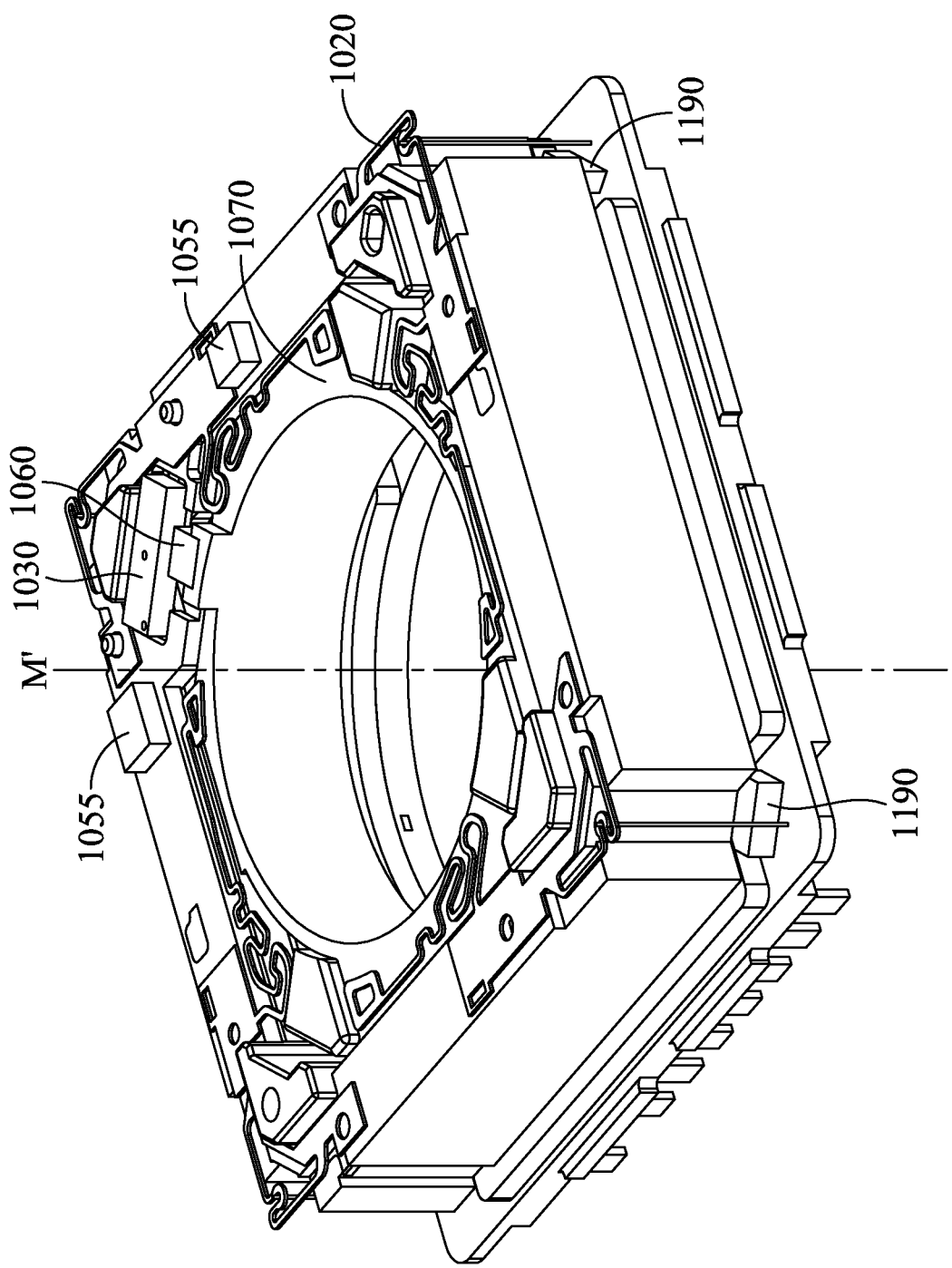
FIG. 15 to FIG. 17 are perspective views of the optical element driving mechanism with the case omitted from different perspectives.
Figure 16:
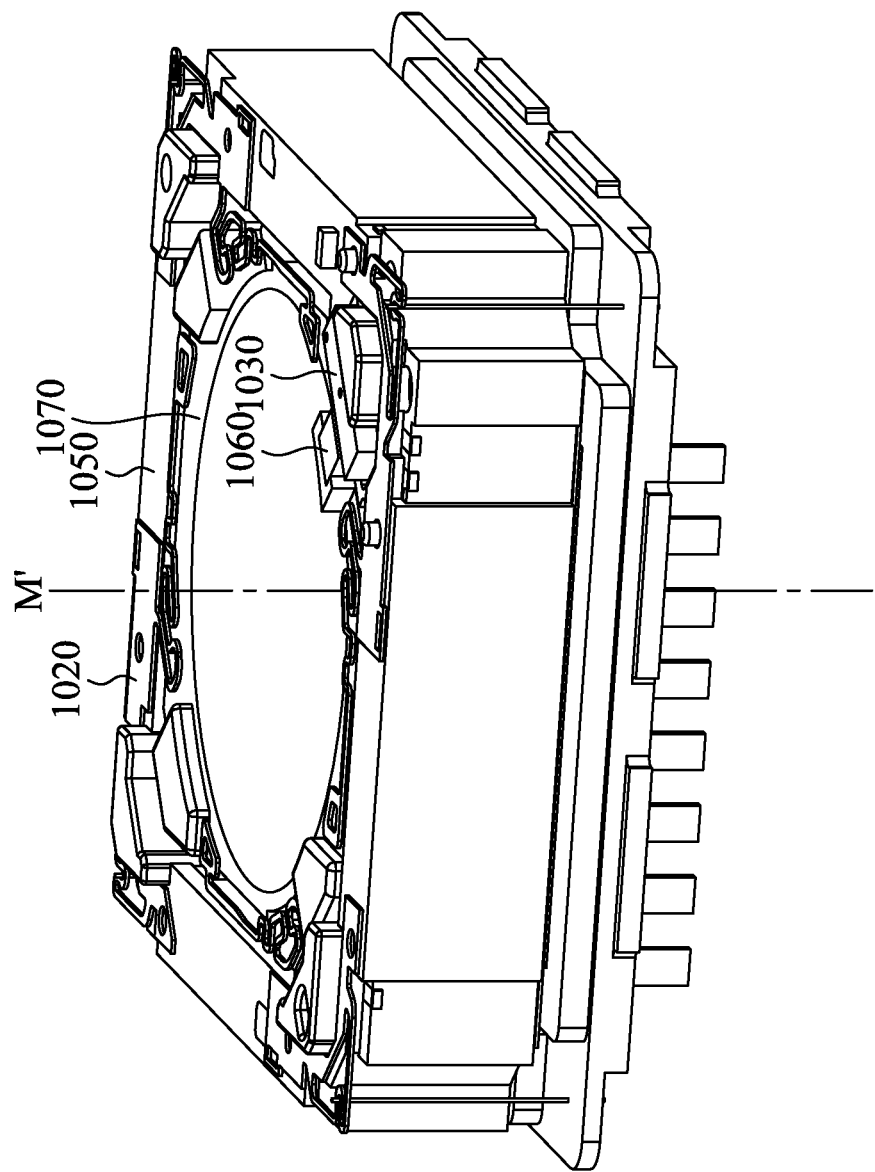

Next, please refer to the FIG. 13 to FIG. 18 to better understand the sensing assembly S'. FIG. 13 is a top view of the optical element driving mechanism 1001. FIG. 14 is a top view of the optical element driving mechanism 1001 with the case 1010 omitted. FIG. 15 to FIG. 17 are perspective views of the optical element driving mechanism 1001 with the case 1010 omitted from different perspectives. FIG. 18 is a bottom view of the optical element driving mechanism 1001.

As shown in FIG. 13 to FIG. 16, the reference element 1060 is disposed on the holder 1070, and the reference element 1060 is close to the light entrance. The top wall 1011 of the case 1010 includes a concave portion 1111. When viewed along the main axis M', the reference element 1060 is revealed in the concave portion 1111. The reference element 1060 may be a magnetic element, such as a magnet. The AF sensing element 1030 is disposed on the surface of the frame 1050 that faces the case 1010 by surface mount technology (SMT), etc. The case 1010 and the AF sensing element 1030 are separated by a distance. Specifically, as shown in FIG. 14, a portion of the circuit assembly 1040 is embedded in the frame 1050, and the other portions are revealed from the frame 1050. The AF sensing element 1030 is disposed on the portion of the circuit assembly 1040 that is revealed from the frame 1050 and thus is electrically connected to the circuit assembly 1040.

In order to protect the AF sensing element 1030, the frame 1050 may further include a plurality of stopping assemblies 1055 (only shown in FIG. 15) disposed adjacent to the AF sensing element 1030 to avoid the AF sensing element 1030 contacting the case 1010. For example, the AF sensing element 1030 may be disposed between the stopping assemblies 1055. The stopping assemblies 1055 is protrude farthar than the AF sensing element 1030, i.e. the top surfaces of each of the stopping assemblies 1055 are closer to the case 1010 than that of the AF sensing element 1030. In some embodiments, the frame 1050 may be located in an extreme position to contact the case 1010. Under such circumstances, the stopping assemblies 1055 of the frame 1050 contact the case 1010 first, so the AF sensing element 1030 does not contact the case 1010 to prevent the AF sensing element 1030 from being damaged. Optionally, the case 1010 may also include one or more stopping assemblies to prevent the AF sensing element 1030 from contacting the case 1010.

From FIG. 13 to FIG. 16, the AF sensing element 1030 is disposed on the corner of the frame 1050 close to the light entrance in this embodiment may be clearly seen. Compared to the situation that the AF sensing element 1030 is disposed on the side of the frame 1050, such configuration may reduce the volume of the optical element driving mechanism 1001 in the plane that is perpendicular to the main axis M'. When viewed along the main axis M', the reference element 1060 does not overlap the AF sensing element 1030.

When the holder 1070 moves, the reference element 1060 disposed on the holder 1070 also moves with the holder 1070, and thus the magnetic field of the reference element 1060 changes accordingly. The change of the magnetic field of the reference element 1060 may be detected by the AF sensing element 1030, and thus the movement of the holder 1070 along a direction that is parallel with the optical axis O' may be obtained.

The change of the magnetic field of the reference element 1060 may be converted to signals through the AF sensing element 1030. The signals may be output to a control unit 1170 (e.g. a central processing unit (CPU)) outside the optical element driving mechanism 1001 or processed internally by the AF sensing element 1030, and thus the position of the holder 1070 is obtained. In order to correct the position of the holder 1070, the signal is input to the AF sensing element 1030 by the control unit 1170. Alternatively, the position of the holder 1070 may be adjusted directly by the AF sensing element 1030 and the movement of the holder 1070 may be controlled directly by the AF sensing element 1030.

The AF sensing element 1030 includes six pins. Two pins are used for power input to provide current for the AF sensing element 1030. Two pins are used for signal input and output, including inputting signals from the control unit 1170 and outputting signals to the control unit 1170. Two pins are used for power supply to provide current to the coil 1080 of the driving assembly D' to achieve autofocus function. In other words, among the six pins of the AF sensing element 1030, four pins are electrically connected to elements outside the optical element driving mechanism 1001, and two pins are electrically connected to the elements (the coil 1080 in this embodiment) inside the optical element driving mechanism 1001.

Also, when viewed in a direction that is perpendicular to the main axis M', the first elastic element 1020 may partially overlaps the AF sensing element 1030 and/or the reference element 1060 in order to achieve miniaturization.

In some embodiments, the optical element driving mechanism 1001 further includes a plurality of damping elements 1190 (only shown in FIG. 15). The damping elements 1190 are made of a material that may absorb shock and may inhibit vibration, such as a gel. The damping element 1190 may be disposed between the frame 1050 and the case 1010, in particular, between the AF sensing element 1030 and the case 1010. Alternatively, the damping element 1190 may be disposed between the holder 1070 and the frame 1050. When the optical element driving mechanism 1001 is impacted by an external force, the damping element 1190 may prevent a severe collision between the frame 1050 and the case 1010 or between the holder 1070 and the frame 1050. Furthermore, the damping element 1190 may help the frame 1050 and the holder 1070 to return to their original positions quickly when they are impacted and may prevent the optical element 1002 in the holder 1070 from being unstable. Therefore, the damping element 1190 may improve the reaction time and the accuracy of the frame 1050 and the holder 1070 during their movement.

As shown in FIG. 17 and FIG. 18, in this embodiment, the sensing assembly S' includes two OIS sensing elements 1160, to respectively sense the movement of the holder 1070 relative to the bottom 1140 along X-axis and along the Y-axis. In this embodiment, the OIS sensing elements 1160 are disposed on a bottom surface 1141 of the bottom 1140, and the bottom surface 1141 is close to a light exit. When viewed along the main axis M', the OIS sensing elements 1160 are revealed in the bottom 1140. Also, when viewed in a direction that is perpendicular to the main axis M', the OIS sensing elements 1160 at least partially overlaps the bottom 1140, so that the bottom 1140 may protect the OIS sensing elements 1160. In some embodiments, the bottom surface 1141 of the bottom 1140 is closer to the light exit than a bottom surface 1161 of the OIS sensing elements 1160 in a direction of the main axis M'.

In addition, in this art, the OIS sensing element 1160 may be disposed on the circuit board 1120. However, if the OIS sensing element 1160 is disposed on the circuit board 1120, the space for placing the coil assembly 1130 is reduced. Therefore, the driving assembly D' may be affected, which is unfavorable for conducting optical image stabilization. Therefore, by placing the OIS sensing element 1160 on the bottom surface 1141 of the bottom 1140, the structure of the coil assembly 1130 may be more complete, and may ensure that the coil assembly 1130 provides sufficient magnetic force and has sufficient structural strength.

To sum up, the AF sensing element 1030 may sense the movement of the holder 1070 along a direction that is parallel with the optical axis O' relative to the frame 1050. The OIS sensing element 1160 may sense the movement of the frame 1050 along a direction that is perpendicular to the optical axis O' relative to the bottom 1140.

In general, the AF sensing element 1030 may be a Hall sensor, a giant magnetoresistive (GMR) sensor, a tunneling magnetoresistive (TMR) sensor, etc. A Hall sensor, a GMR sensor, or a TMR sensor means that other elements such as an amplifier circuit, a temperature-compensation circuit, and a power voltage-stabilization circuit are integrated into the sensor in addition to the Hall element, the GMR element, and the TMR element. Such a sensor is referred to as an All-in-One integrated circuit (All-in-One IC). After current is supplied to an All-in-One IC, the All-in-One IC may supply current to the other elements. Additionally, the All-in-One IC has the ability to control other elements. As for the OIS sensing element 1160, it is a Hall element, a GMR element, a TMR element, etc., to which a current has to be supplied and it may not supply the current to the other elements nor have the ability to control other elements.

The description related to the AF sensing element 1030 and the OIS sensing element 1160 is provided to illustrate the difference between a Hall sensor/a GMR sensor/a TMR sensor and a Hall element/a GMR element/a TMR element, and it is not limited thereto. For example, the AF sensing element 1030 may be a Hall element and the OIS sensing element 1160 may be an All-in-One IC.

Figure 19:
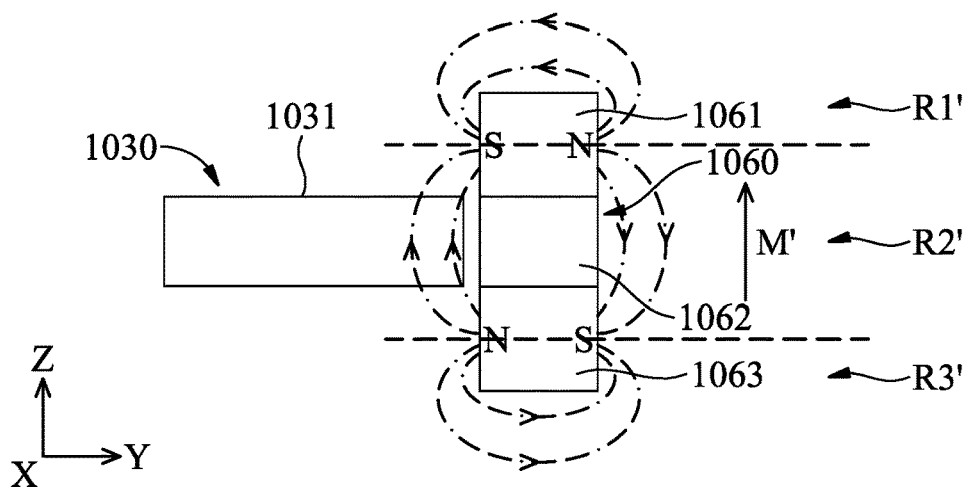
FIG. 19 to FIG. 21 are schematic views illustrating different configurations of an AF sensing element and a reference element.
Figure 20:
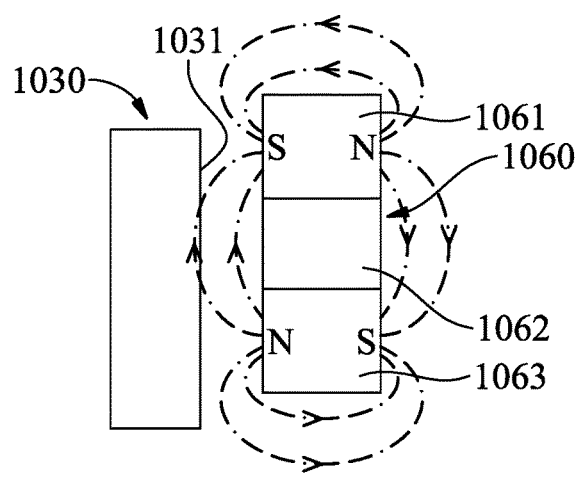
Figure 21:
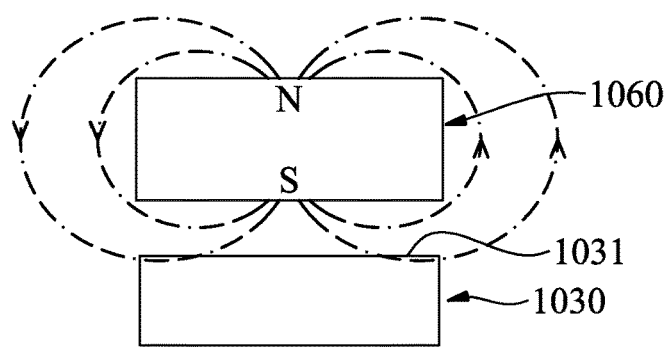

FIG. 19 to FIG. 21 are schematic views illustrating different configurations of the AF sensing element 1030 and the reference element 1060, and the position of the AF sensing element 1030 is merely illustrative. It should be noted that when the displacement correction of optical image stabilization is conducted, the frame 1050 moves in a direction that is perpendicular to the optical axis O' together with the holder 1070 therein. Since the AF sensing element 1030 is disposed on the frame 1050 and the reference element 1060 is disposed on the holder 1070, the movement of the AF sensing element 1030 in a direction that is perpendicular to the optical axis O' (OIS) is substantially the same as that of the reference element 1060. Therefore, the difference of the movement between the AF sensing element 1030 and the reference element 1060 is in a direction that is parallel with the optical axis O' (AF). That is, when the AF sensing element 1030 detects the change of the magnetic field of the reference element 1060, the AF sensing element 1030 may effectively detect the movement of the reference element 1060 in a direction that is parallel with the optical axis O' (AF) instead of detecting the movement of the reference element 1060 in a direction that is perpendicular to the optical axis O' (OIS).

If no element is disposed between the AF sensing element 1030 and the reference element 1060, then the AF sensing element 1030 may sense a more undisturbed movement of the reference element 1060 along a direction that is parallel with the optical axis O' to improve the sensing accuracy. The AF sensing element 1030 includes a surface 1031. When the holder 1070 moves, the change of the magnetic lines of force of the reference element 1060 may be sensed by the surface 1031. In general, the magnetic lines of force are closed curves that are not intersected. Inside the reference element 1060, the direction of the magnetic lines of force points to the N-pole from the S-pole. Outside the reference element 1060, the direction of the magnetic lines of force points to the S-pole from the N-pole. In FIG. 19 to FIG. 21, the magnetic lines of force are shown in dotted lines, but does not represent the actual range of the magnetic field.

As shown in FIG. 19, in this embodiment, the surface 1031 is perpendicular to the main axis M'. When viewed in a direction that is perpendicular to the main axis M', the reference element 1060 partially overlaps the AF sensing element 1030. The reference element 1060 is a multi-pole magnet. The reference element 1060 includes at least two magnetic domains 1061, 1063 and a depletion region 1062 located between the magnetic domain 1061 and the magnetic domain 1063. When a multi-pole magnet is manufactured, only the magnetic domain 1061 and the magnetic domain 1063 are magnetized, so a depletion region 1062 is formed. The magnetic domain 1061 and the magnetic domain 1063 have a pair of N-pole and S-pole, respectively.

By designing the reference element 1060 as a multi-pole magnet with multiple magnetic domains, the magnetic lines of force of the reference element 1060 are closer. Additionally, the sensing accuracy may be further improved without increasing the volume of the reference element 1060. As a result, the size of the reference element 1060 may also be reduced, thereby the power consumption of the optical element driving mechanism 1 may be reduced, and miniaturization may be achieved.

The S-pole of the magnetic domain 1061 is toward the AF sensing element 1030, and the N-pole of the magnetic domain 1063 is toward the AF sensing element 1030. It should be noted that in some other embodiments, the N-pole of the magnetic domain 1061 is toward the AF sensing element 1030, and the S-pole of the magnetic domain 1063 is toward the AF sensing element 1030.

Since the magnetic lines of force points to the S-pole from the N-pole, the regions where the AF sensing element 1030 may be located is divided into a first region R1, a second region R2, and a third region R3 by the different directions of the magnetic lines of force. When the AF sensing element 1030 is located in the first region R1, the sensed magnetic lines of force point to the S-pole of the magnetic domain 1061 from the N-pole of the magnetic domain 1061. When the AF sensing element 1030 is located in the second region R2, the sensed magnetic lines of force point to the S-pole of the magnetic domain 1061 from the N-pole of the magnetic domain 1063. When the AF sensing element 1030 is located in the third region R3, the sensed magnetic lines of force point to the S-pole of the magnetic domain 1063 from the N-pole of the magnetic domain 1063. Moreover, the density of magnetic lines of force is different in the first region R1, the second region R2, and the third region R3.

When the holder 1070 moves along a direction that is parallel with the optical axis O', the reference element 1060 disposed on the holder 1070 also moves along a direction that is parallel with the optical axis O' relative to the AF sensing element 1030, so that the AF sensing element 1030 may sense the density change of the magnetic lines of force and/or the direction change of the magnetic lines of force. For example, when the holder 1070 moves toward the top wall 1011 of the case 1010 (+Z-axis), the position of the AF sensing element 1030 may be in the same region, change into the second region R2 from the first region R1, or change into the third region R3 from the second region R2. The position of the holder 1070 may be accurately known since the density change of the magnetic lines of force and/or the direction change of the magnetic lines of force of the reference element 1060 is sensed by the AF sensing element 1030.

The difference between FIG. 20 and FIG. 19 is that the surface 1031 is parallel with the main axis M'. Similarly, in FIG. 20, the position of the holder 1070 may be accurately known since the density change of the magnetic lines of force and/or the direction change of the magnetic lines of force of the reference element 1060 is sensed by the AF sensing element 1030. However, the movement range of the AF sensing element 1030 is smaller.

The difference between FIG. 21 and FIG. 19 is that the reference element 1060 is not a multi-pole magnet. Therefore, the magnetic lines of force from the reference element 1060 are in the same direction on the surface 1031, so that the AF sensing element 1030 only senses the magnetic lines of force in the same direction. Thus, in FIG. 21, the position of the holder 1070 may be known only by the density change of the magnetic lines of force of the reference element 1060 sensed by the AF sensing element 1030. The position of the holder 1070 cannot be known by the direction change of the magnetic lines of force of the reference element 1060.

Figure 22:
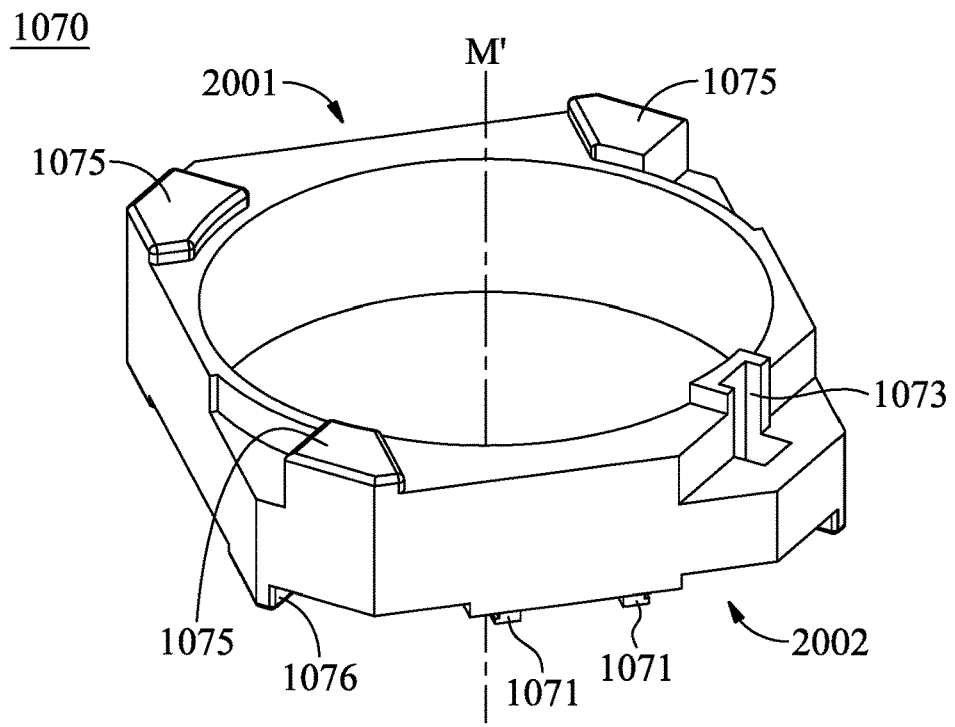
FIG. 22 and FIG. 23 are perspective views of the holder from different perspectives.
Figure 23:
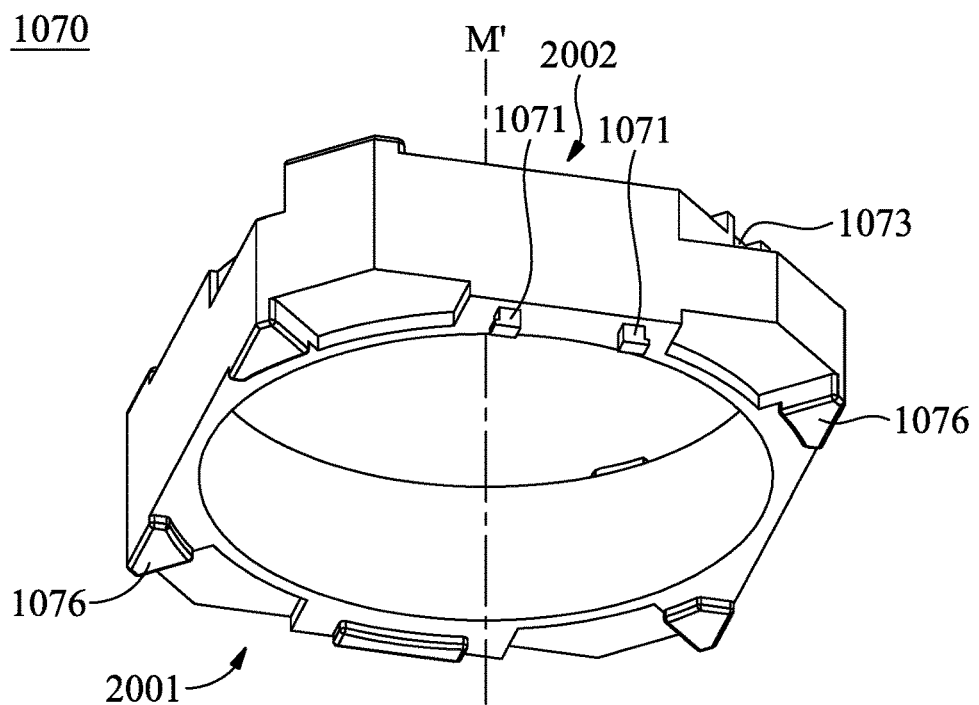
Figure 24:
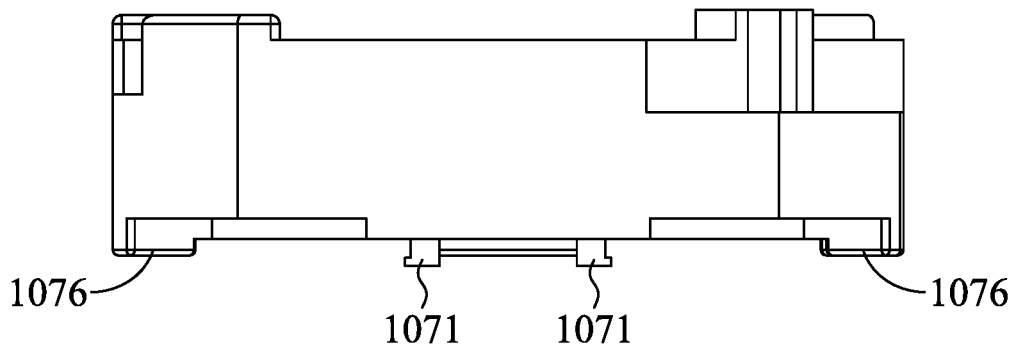
FIG. 24 is a side view of the holder.

Next, please refer to FIG. 22 to FIG. 24. FIG. 22 and FIG. 23 are perspective views of the holder 1070 from different perspectives. FIG. 24 is a side view of the holder 1070.

The holder 1070 includes a plurality of upper stopping portions 1075 and a plurality of lower stopping portions 1076. When viewed in a direction that is perpendicular to the main axis M', the upper stopping portions 1075 and the lower stopping portions 1076 are located on different sides of the holder 1070. The upper stopping portions 1075 are closer to the light entrance than the lower stopping portions 1076.

When the driving assembly D' drives the holder 1070 to move along a direction that is parallel to the optical axis O' to an extreme position, the upper stopping portions 1075 contact the case 1010 or the lower stopping portions 1076 contact the bottom 1140. Therefore, the rest of the holder 1070 will not contact the case 1010 or the bottom 1140 and the rest of the holder 1070 may be prevented from colliding with the case 1010 or the bottom 1140. To sum up, the upper stopping portions 1075 may restrict the movement of the holder 1070 relative to the case 1010 and the lower stopping portions 1076 may restrict the movement of the holder 1070 relative to the bottom 1140.

The holder 1070 includes a receiving portion 1073 for receiving the reference element 1060. It should be noted that the reference element 1060 does not collide with the top wall 1011 of the case 1010 because the case 1010 includes the concave portion 1111. When viewed in a direction that is perpendicular to the main axis M', the reference element 1060 may protrude farther than the upper stopping portions 1075, i.e. the top surface of the reference element 1060 is closer to the top wall 1011 of the case 1010 than that of the upper stopping portions 1075.

The number and positions of the stopping assemblies 1055 of the frame 1050, the upper stopping portions 1075 and the lower stopping portions 1076 of the holder 1070 may be adjusted. For example, in order to effectively disperse the collision force and improve the overall stability of the optical element driving mechanism 1001, three or more upper stopping portions 1075 or lower stopping portions 1076 may be provided, respectively.

In addition, the holder 1070 includes two electrical connection portions 1071 disposed on the second side 2002 of the holder 1070 and are close to the light exit. The electrical connection portions 1071 are used for electrically connected to the coils 1080 of the driving assembly D'. A portion of the coil 1080 extends from the coil 1080 and surrounds the electrical connection portions 1071. The coil 1080 may be electrically connected to other elements, e.g. the second elastic element 1100, by being soldered onto the electrical connection portions 1071 and other methods.

In the art, since the two coils 1080 are disposed on the opposite sides of the holder 1070, the two electrical connection portions 1071 are generally disposed on the opposite sides of the holder 1070 to facilitate the coil 1080 surround the electrical connection portion 1071. However, the two electrical connection portions 1071 may be both disposed on the second side 2002 since no magnetic element or coil group is disposed on the second side 2002 in the present disclosure to make use of the space. In addition, as shown in FIG. 12, the circuit board 1120 further includes a circuit board concave portion 1121 for receiving the two electrical connection portions 1071.

It should be noted that the electrical connection portions 1071 do not collide with the circuit board 1120 because the circuit board 1120 includes the circuit board concave portion 1121. When viewed in a direction that is perpendicular to the main axis M', the electrical connection portions 1071 may protrude farther than the lower stopping portions 1076, i.e. the bottom surfaces of each of the electrical connection portions 1071 are closer to the circuit board 1120 than that of the lower stopping portions 1076.

Please refer to FIG. 10 again to understand how the current flows through the optical element driving mechanism 1001. In detail, during autofocus (AF) operation, the current starts to flow into the optical element driving mechanism 1001 from the external electrical connection portion 1150. Then, the current flows through the circuit provided in the bottom 1140, the third elastic element 1110, the first elastic element 1020, and the circuit assembly 1040 in the frame 1050 to supply power to the AF sensing element 1030. As described above, in this embodiment, the AF sensing element 1030 may supply power to other elements. The current supplied by the AF sensing element 1030 flows through the second elastic element 1100 and the electrical connection portions 1071 to apply the current to the coil 1080 of the driving assembly D'. Therefore, the magnetic force may be generated between the coil 1080 of the driving assembly D' and the first magnetic elements 1091 of the magnetic assembly 1090, so that the holder 1070 may move along a direction that is parallel with the optical axis O' relative to the frame 1050 to achieve autofocus (AF).

During optical image stabilization (OIS) operation, the current starts to flow into the optical element driving mechanism 1001 from the external electrical connection portion 1150. Then, the current flows through the circuit provided in the bottom 1140 and the coil assembly 1130 provided in the circuit board 1120. Therefore, the magnetic force may be generated between the circuit assembly 1130 and the second magnetic element 1092 of the magnetic assembly 1090, so that the frame 1050 may move along a direction that is perpendicular to the optical axis O' relative to the bottom 1140 to achieve optical image stabilization (OIS) functionality.

Figure 25:
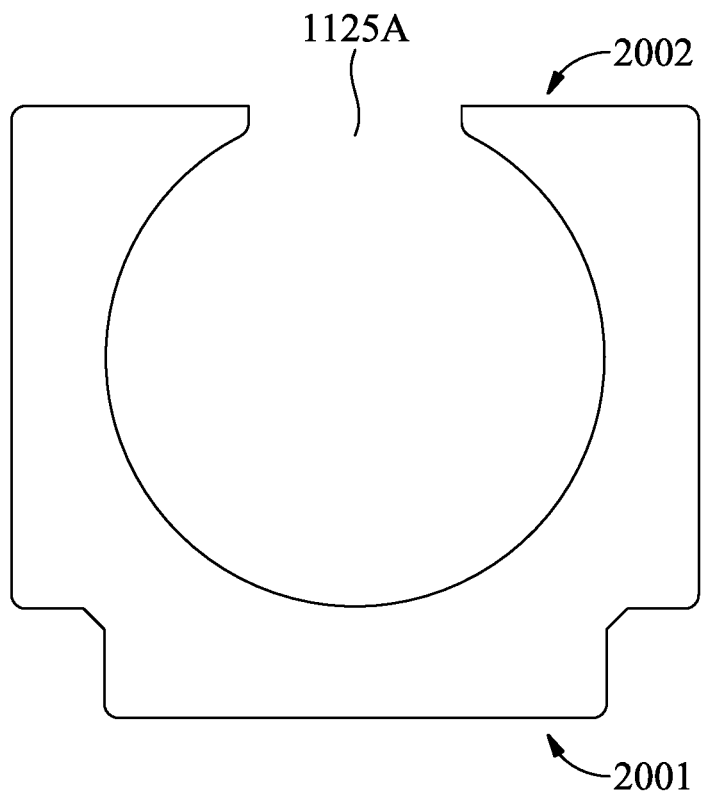
FIG. 25 is a schematic view of a circuit board according to other embodiments.

FIG. 25 is a schematic view of a circuit board 1120A according to other embodiments. Since no coil group is disposed on the second side 2002 of the circuit board 1120, the shape of the circuit board 1120 may be changed. For example, the circuit board 1120A is substantially C-shaped. The circuit board 1120A includes an opening 1125A. During the manufacture of the circuit board 1120A, a plurality of circuit boards 1120A may be engaged with each other via their openings 1125A. Therefore, waste of material may be reduced and cost may be accordingly saved.

Based on the present disclosure, even no magnetic element and coil group are disposed on one side of the optical element driving mechanism, the driving assembly may still effectively achieve autofocus (AF) and optical image stabilization (OIS). In addition, during the operation of the optical element driving mechanism, the sensing assembly may sense the movement of the holder relative to the frame and control the driving assembly to achieve closed-loop feedback.

The foregoing outlines features of several embodiments so that those skilled in the art may better understand the aspects of this disclosure. Those skilled in the art should appreciate that they may readily use this disclosure as a basis for designing or modifying other processes and structures for carrying out the same purposes and/or achieving the same advantages of the embodiments introduced herein. Those skilled in the art should also realize that such equivalent constructions do not depart from the spirit and scope of this disclosure, and that they may make various changes, substitutions, and alterations herein without departing from the spirit and scope of this disclosure. In addition, the scope of this disclosure is not limited to the specific embodiments described in the specification, and each claim constitutes a separate embodiment, and the combination of various claims and embodiments are within the scope of the disclosure.

What is claimed is:

1. An optical element driving mechanism comprising a main axis, wherein the optical element driving mechanism comprises:
    a fixed part;
    a movable part moving relative to the fixed part, wherein the movable part and the fixed part are arranged along the main axis, and the movable part comprises:
        a frame; and
        a holder moving relative to the frame;
    a first driving assembly driving the holder to move; and
    a sensing assembly comprising:
        a reference element; and
        a sensing element sensing a movement of the reference element in order to sense a movement of the holder relative to the frame,
    wherein the reference element is disposed on the holder and the reference element is close to a light entrance,
    wherein the holder further comprises a first stopping portion, and the reference element protrudes farther than the first stopping portion when viewed in a direction that is perpendicular to the main axis.

2. The optical element driving mechanism as claimed in claim 1, wherein the first driving assembly comprises two coils disposed on opposite sides of the movable part, and a winding axis of each of the two coils is perpendicular to the main axis.

3. The optical element driving mechanism as claimed in claim 2, wherein the first driving assembly further comprises a plurality of magnetic elements, the fixed part is polygonal when viewed along the main axis, and none of the magnetic elements are disposed on a side of the fixed part.

4. The optical element driving mechanism as claimed in claim 3, further comprising a balance weight piece disposed on the side where no magnetic elements are disposed.

5. The optical element driving mechanism as claimed in claim 3, wherein sizes of the magnetic elements are different in a direction that is parallel with the main axis.

6. The optical element driving mechanism as claimed in claim 3, wherein sizes of the magnetic elements are different in a direction that is perpendicular to the main axis.

7. The optical element driving mechanism as claimed in claim 3, further comprising a second driving assembly driving the frame to move, wherein the second assembly comprises a coil assembly corresponding to the magnetic elements, and the coil assembly is not disposed on the side where no magnetic elements are disposed.

8. The optical element driving mechanism as claimed in claim 7, wherein the coil assembly comprises a first coil group and a second coil group disposed on adjacent sides of the fixed part, and a number of coils of the first coil group is different than a number of coils of the second coil group.

9. The optical element driving mechanism as claimed in claim 1, wherein the fixed part further comprises a circuit board with a first direction maximum size extending in a first direction that is perpendicular to the main axis and a second direction maximum size extending in a second direction that is perpendicular to the main axis and the first direction, and the first direction maximum size is different from the second direction maximum size.

10. The optical element driving mechanism as claimed in claim 1, wherein the fixed part further comprises a circuit board that is C-shaped.

11. The optical element driving mechanism as claimed in claim 1, wherein the movable part further comprises an elastic element connected to the holder and the frame, and the elastic element partially overlaps at least one of the sensing element and the reference element when viewed in a direction that is perpendicular to the main axis.

12. The optical element driving mechanism as claimed in claim 1, wherein the fixed part comprises a case, the case comprises a concave portion, and the reference element is revealed in the concave portion when viewed along the main axis.

13. The optical element driving mechanism as claimed in claim 1, wherein the sensing element is disposed on the frame, and the reference element does not overlap the sensing element when viewed along the main axis.

14. The optical element driving mechanism as claimed in claim 1, wherein the holder further comprises two electrical connection portions connected to the first driving assembly, and the electrical connection portions are disposed on a same side of a bottom surface of the holder.

15. The optical element driving mechanism as claimed in claim 14, wherein the holder further comprises a second stopping portion, and the electrical connection portions protrude farther than the second stopping portion when viewed in a direction that is perpendicular to the main axis.

16. The optical element driving mechanism as claimed in claim 14, wherein the fixed part further comprises a circuit board comprising a circuit board concave portion for receiving the electrical connection portions.

17. The optical element driving mechanism as claimed in claim 1, wherein the sensing assembly further comprises another sensing element for sensing a movement of the frame relative to the fixed part, the another sensing element is revealed in the fixed part when viewed along the main axis, and the another sensing element partially overlaps the fixed part when viewed in a direction that is perpendicular to the main axis.

18. The optical element driving mechanism as claimed in claim 1, further comprising a damping element disposed between the frame and the fixed part.

* * * * *